US012804675B2

(12) United States Patent
Elshafie et al.

(10) Patent No.: US 12,804,675 B2
(45) Date of Patent: Nov. 17, 2026

(54) SWITCH OF ACTIVITY IN COMMON FREQUENCY RESOURCE

(71) Applicant: QUALCOMM Incorporated, San Diego, CA (US)

(72) Inventors: Ahmed Elshafie, San Diego, CA (US); Diana Maamari, San Diego, CA (US); Le Liu, San Jose, CA (US); Marwen Zorgui, San Diego, CA (US); Ahmed Attia Abotabl, San Diego, CA (US); Yan Zhou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 560 days.

(21) Appl. No.: 18/339,144

(22) Filed: Jun. 21, 2023

(65) Prior Publication Data

US 2024/0430906 A1 Dec. 26, 2024

(51) Int. Cl.

*H04W 48/16* (2009.01)
*H04W 72/0453* (2023.01)
*H04W 72/232* (2023.01)

(52) U.S. Cl.

CPC ......... *H04W 72/232* (2023.01); *H04W 48/16* (2013.01); *H04W 72/0453* (2013.01)

(58) Field of Classification Search

CPC ................ H04L 5/0094; H04W 48/16; H04W 72/0453; H04W 72/23; H04W 72/232
USPC ........................................................ 370/329
See application file for complete search history.

(56) References Cited

U.S. PATENT DOCUMENTS

| | | | | |
|---|---|---|---|---|
| 12,237,930 | B2 * | 2/2025 | Zhou | H04L 1/1854 |
| 2020/0107336 | A1 * | 4/2020 | Yang | H04L 1/0025 |
| 2020/0170000 | A1 * | 5/2020 | Hang | H04B 7/0408 |
| 2020/0260442 | A1 * | 8/2020 | Yi | H04L 5/14 |
| 2021/0336673 | A1 * | 10/2021 | Taherzadeh Boroujeni | H04W 72/542 |
| 2021/0360666 | A1 * | 11/2021 | Yoshimura | H04L 1/1896 |
| 2022/0173843 | A1 * | 6/2022 | Nakashima | H04L 1/1822 |
| 2022/0210766 | A1 * | 6/2022 | Liu | H04W 72/30 |
| 2022/0303892 | A1 | 9/2022 | Awadin et al. | |

(Continued)

FOREIGN PATENT DOCUMENTS

WO 2022081996 A1 4/2022

OTHER PUBLICATIONS

International Search Report and Written Opinion—PCT/US2024/032988—ISA/EPO—Oct. 8, 2024.

*Primary Examiner* — Robert J Lopata
(74) *Attorney, Agent, or Firm* — Procopio, Cory, Hargreaves & Savitch LLP

(57) ABSTRACT

The apparatus may be a wireless device configured to receive, via a frequency resource common to a plurality of wireless devices including the first wireless device, a common dynamic indication indicating at least a DCI monitoring behavior for the plurality of wireless devices and monitor, based on the indicated DCI monitoring behavior, for a DCI via the frequency resource common to the plurality of wireless devices. The apparatus may be a network node configured to output a common dynamic indication indicating at least a DCI monitoring behavior for transmission to a plurality of wireless devices via a frequency resource common to the plurality of wireless devices and output, based on the indicated DCI monitoring behavior, a DCI for transmission via the frequency resource common to the plurality of wireless devices.

26 Claims, 14 Drawing Sheets

(56) References Cited

U.S. PATENT DOCUMENTS

| | | | | |
|---|---|---|---|---|
| 2023/0063026 | A1* | 3/2023 | Reial | H04W 52/0235 |
| 2023/0164807 | A1* | 5/2023 | Lee | H04W 4/06<br>370/329 |
| 2023/0209465 | A1* | 6/2023 | Zhou | H04W 52/0216<br>370/311 |
| 2024/0032070 | A1* | 1/2024 | Zhou | H04W 72/30 |
| 2024/0057114 | A1* | 2/2024 | Lei | H04W 72/121 |
| 2024/0072973 | A1* | 2/2024 | Niu | H04L 5/0053 |
| 2025/0016781 | A1* | 1/2025 | Lee | H04W 74/0833 |
| 2025/0126622 | A1* | 4/2025 | Ma | H04L 5/0053 |

* cited by examiner

730

| Codepoint | Operation |
|---|---|
| 0/00 | State #1 (SSSG#0) |
| 1/01 | State #2 (SSSG#1) |
| 10 | PDCCH Skipping for duration T1 |
| 11 | Reserved OR<br>PDCCH Skipping for duration T2 |

780

| Codepoint | Operation |
|---|---|
| 00 | State #1 (SSSG#0) |
| 01 | State #2 (SSSG#1) |
| 10 | State #3 (SSSG#2) |
| 11 | Reserved OR<br>PDCCH Skipping for duration T |

SWITCH OF ACTIVITY IN COMMON FREQUENCY RESOURCE

TECHNICAL FIELD

The present disclosure relates generally to communication systems, and more particularly, to wireless communication including a multicast and broadcast service (MBS) in a wireless network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device (e.g., a UE) or a component of a wireless device configured to receive, via a frequency resource common to a plurality of wireless devices including the first wireless device, a common dynamic indication indicating at least a downlink control information (DCI) monitoring behavior for the plurality of wireless devices. The apparatus may further be configured to monitor, based on the indicated DCI monitoring behavior, for a DCI via the frequency resource common to the plurality of wireless devices.

In an aspect of the disclosure, a method, a computer-readable medium, and an apparatus are provided. The apparatus may be a network node, a network device or a component of a network node or network device configured to output a common dynamic indication indicating at least a DCI monitoring behavior for a plurality of wireless devices for transmission to the plurality of wireless devices via a frequency resource common to the plurality of wireless devices. The apparatus may further be configured to output, based on the indicated DCI monitoring behavior, a DCI for transmission via the frequency resource common to the plurality of wireless devices.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
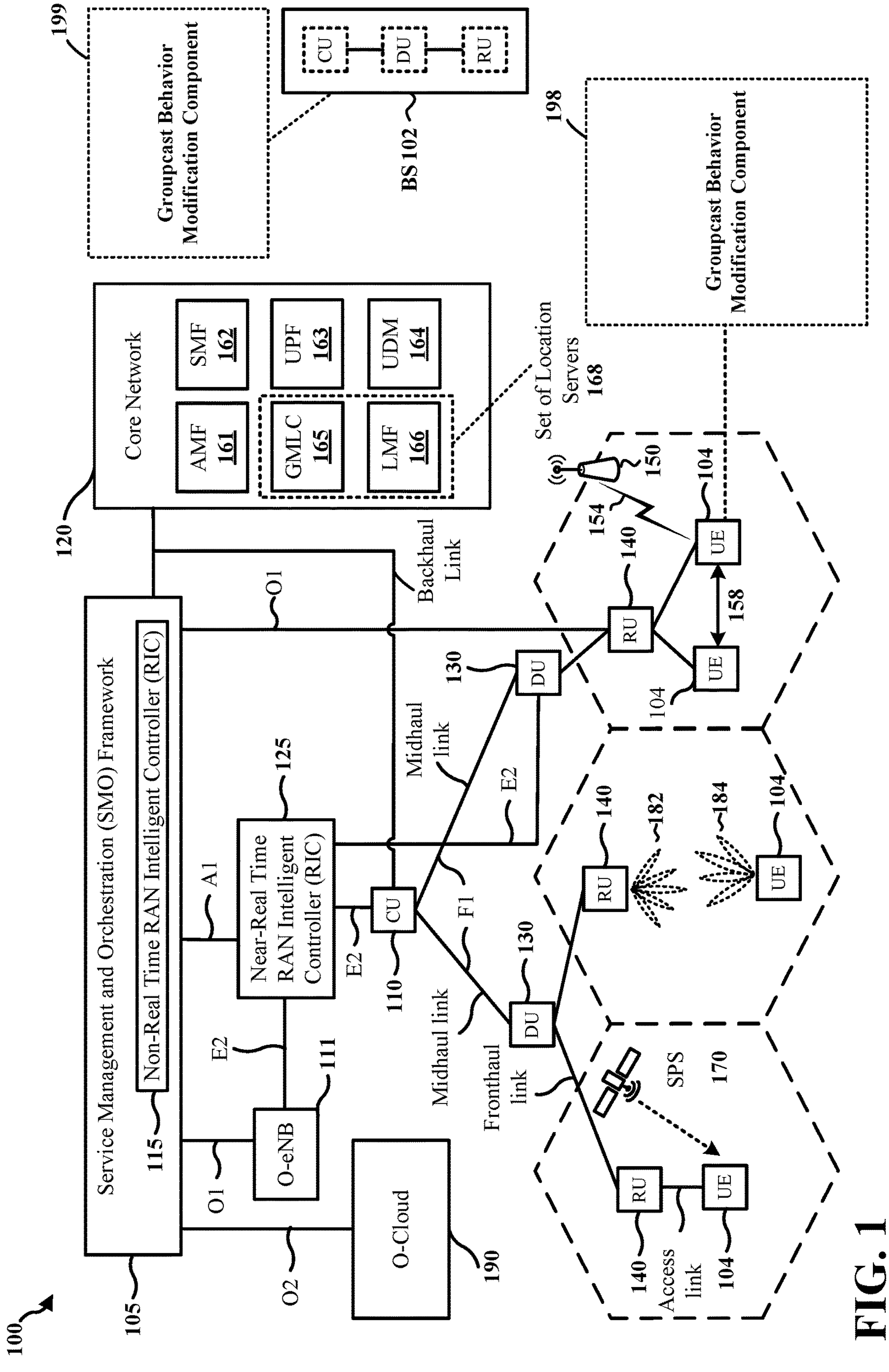
FIG. 1 is a diagram illustrating an example of a wireless communications system and an access network.

In some aspects of wireless communication, a wireless device (e.g., a UE) may be configured with parameters controlling the monitoring for unicast DCI. The wireless device may then receive a first unicast-DCI triggering a unicast-DCI monitoring behavior based on the configured parameters. In some aspects, the unicast-DCI monitoring behavior may be associated with one of omitting or skipping physical DL control channel (PDCCH) monitoring for an indicated amount of time (e.g., an indicated duration). The unicast-DCI monitoring behavior, in some aspects, may alternatively, or additionally, include switching a search space set group (SSSG) monitored by the wireless device. The unicast-DCI monitoring behavior, in some aspects, may be indicated via scheduling DCI (e.g., DCI that allocates/schedules resources for the UE for transmission or reception such as for one or more of a PDCCH or PDSCH transmission or reception).

Various aspects relate generally to jointly controlling and/or indicating DCI monitoring behavior for a plurality of wireless devices (e.g., UEs). For example, the plurality of wireless devices may be associated with, e.g., receiving, an MBS. Some aspects more specifically relate to transmitting and/or receiving, via a frequency resource common to a plurality of wireless devices (e.g., a plurality of wireless devices associated with a same multicast or broadcast group or transmission), a common dynamic indication indicating at least one DCI monitoring behavior for the plurality of wireless devices. The plurality of wireless devices may then begin monitoring, based on the indicated DCI monitoring behavior, for a DCI via the frequency resource common to the plurality of wireless devices and a base station may output, or transmit, DCI associated with the MBS based on the DCI monitoring behavior implemented at the plurality of wireless devices.

Particular aspects of the subject matter described in this disclosure can be implemented to realize one or more of the following potential advantages. In some examples, by transmitting a dynamic indication indicating at least one DCI monitoring behavior for the plurality of wireless devices, the described techniques can be used to more efficiently adjust control monitoring for multiple UEs. Aspects may help to reduce the overhead associated with the control information for an MBS, for example.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue some-times occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a groupcast behavior modification component 198 that may be configured to receive, via a frequency resource common to a plurality of wireless devices including the first wireless device, a common dynamic indication indicating at least a DCI monitoring behavior for the plurality of wireless devices. The groupcast behavior modification component 198 may further be configured to monitor, based on the indicated DCI monitoring behavior, for a DCI via the frequency resource common to the plurality of wireless devices. In certain aspects, the base station 102 may have a groupcast behavior modification component 199 that may be configured to output a common dynamic indication indicating at least a DCI monitoring behavior for a plurality of wireless devices for transmission to the plurality of wireless devices via a frequency resource common to the plurality of wireless devices. The groupcast behavior modification component 199 may further be configured to output, based on the indicated DCI monitoring behavior, a DCI for transmission via the frequency resource common to the plurality of wireless devices. While aspects of the following description may relate to 5G NR, aspects may be applicable to other aspects of wireless communication.

Figures 2A, 2B, 2C, 2D:
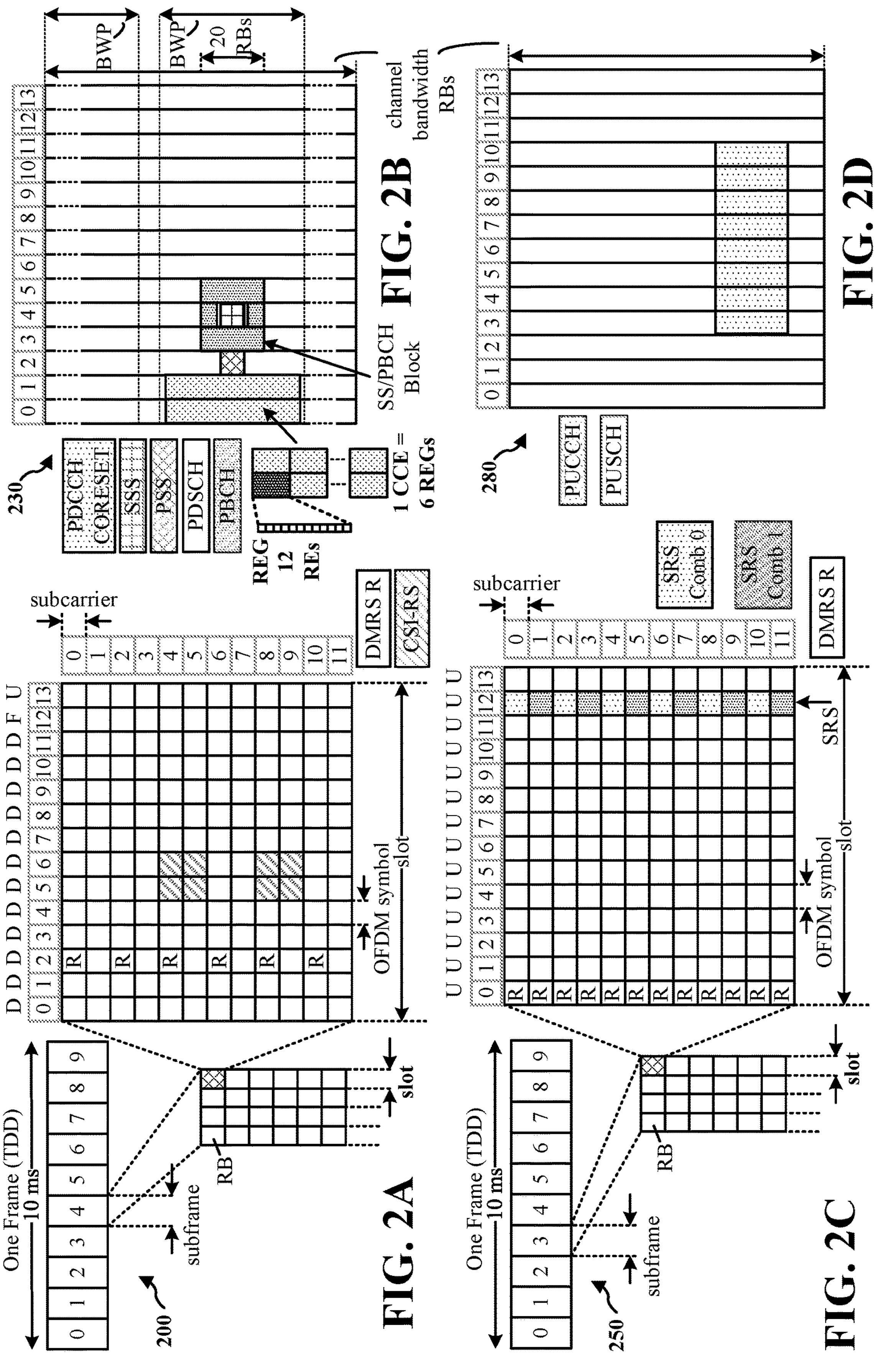
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
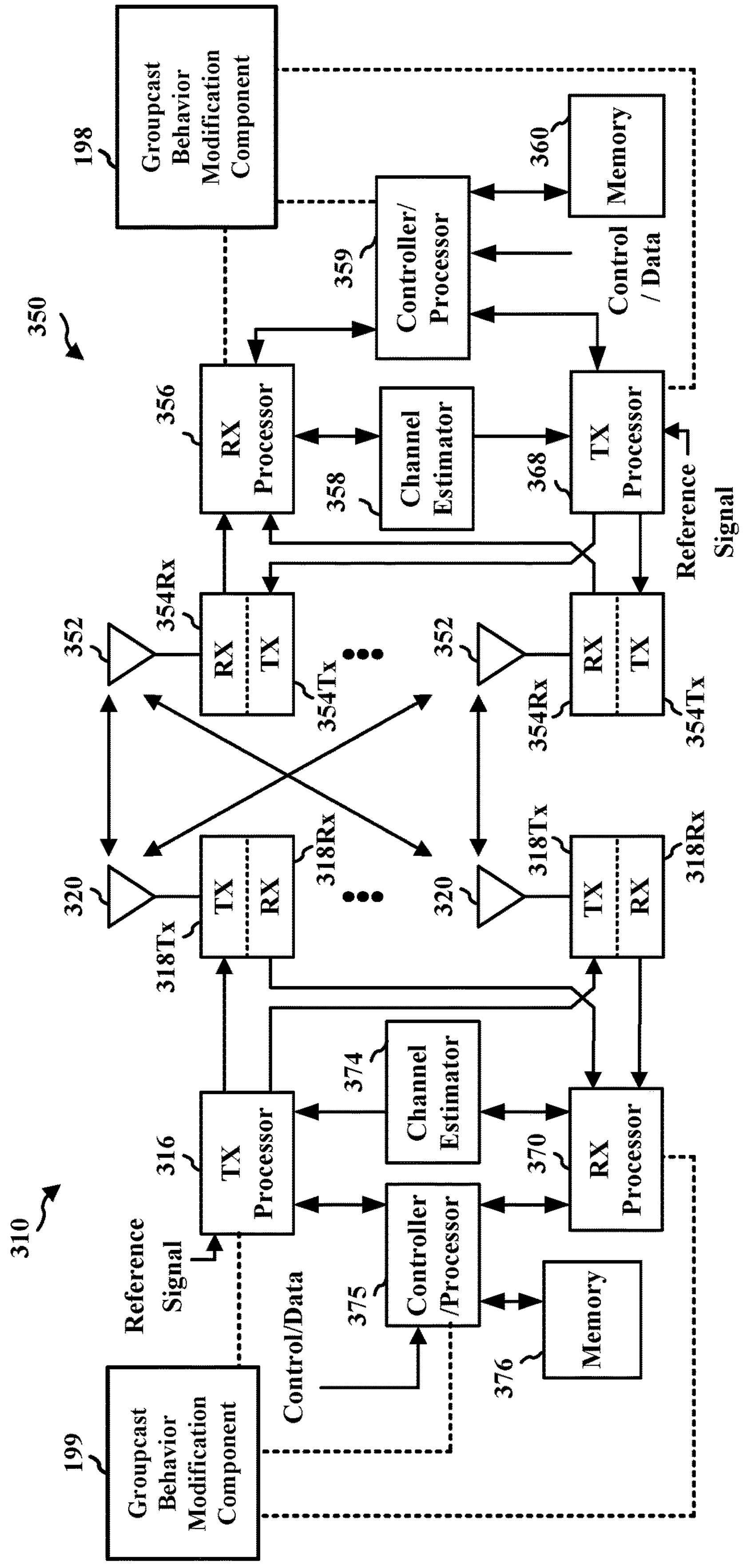
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the groupcast behavior modification component 198 of FIG. 1.

At least one of the TX processor 316, the RX processor 370, and the controller/processor 375 may be configured to perform aspects in connection with the groupcast behavior modification component 199 of FIG. 1.

In some aspects of wireless communication, a wireless device (e.g., a UE) may be configured with parameters controlling the monitoring for unicast DCI. The wireless device may then receive a first unicast-DCI triggering a unicast-DCI monitoring behavior based on the configured parameters. In some aspects, the unicast-DCI monitoring behavior may be associated with one of omitting or skipping PDCCH monitoring for an indicated amount of time (e.g., an indicated duration). For example, a wireless device may be configured (e.g., via RRC) with a set of M values (e.g., PDCCH monitoring skipping/omitting duration values measured in slots) for each BWP from which a particular duration value may be indicated by the first unicast-DCI. Table 2 illustrates various examples of different behaviors that can be configured for the UE. A behavior may be mapped to a codepoint of an indication field of a DCI for the UE, for example. Then, if the UE receives the [DCI] codepoint, the UE can determine to apply the corresponding behavior. As an example, the indication for behavior 1A may indicate to the UE to apply PDCCH skipping for a value X among M RRC configured values.

TABLE 2

| | | |
|---|---|---|
| PDCCH Skipping | Behavior 1 | PDCCH skipping is not activated/triggered |
| | Behavior 1A | Stopping PDCCH monitoring for duration X |
| SSSG Switching | Behavior 2 | Stopping monitoring SS sets associated with SSSG#1 and SSSG#2; and Monitoring SS sets associated with SSSG#0 |
| | Behavior 2A | Stopping monitoring SS sets associated with SSSG#0 and SSSG#2; and Monitoring SS sets associated with SSSG#1 |
| | Behavior 2B | Stopping monitoring SS sets associated with SSSG#0 and SSSG#1; and Monitoring SS sets associated with SSSG#2 |

The unicast-DCI monitoring behavior, in some aspects, may alternatively, or additionally, include switching a SSSG monitored by the wireless device. The use of different SSSGs, in some aspects, may be an example of one possible implementation of a network energy saving (NES) technique or an NES mode of operation and references to switching between SSSGs may apply to switching between different NES techniques or NES modes of operation (e.g., different modes of operation related to a same NES technique). As an example, an NES technique in a spatial domain may include dynamic antenna adaptation for network energy savings. In the discussion below, the term "NES" may refer to NES techniques or NES modes of operation generally, and the term "NES #," where "#" is a numerical value, may refer to a particular NES technique or NES mode of operation applied at a particular time. The unicast-DCI monitoring behavior, in some aspects, may be indicated via scheduling DCI (e.g., DCI providing a resource grant). In some aspects, the different unicast-DCI monitoring behaviors may be mapped to a set of codepoints associated with an indication field in the first unicast-DCI. In some aspects, PDCCH skipping and SSSG switching may be applied at least for Type3 common search space (CSS) and UE-specific search space (USS). Other CSSs, in some aspects, may be monitored regardless of SSSG switching and PDCCH skipping with some exceptions.

In some aspects, a unicast DCI may also be used to indicate for a wireless device to switch from a first BWP to a second BWP. The unicast DCI, in some aspects, may further indicate a threshold time for BWP inactivity (e.g., a BWP inactivity timer) after which a wireless device may switch back to the first BWP (or one of a default BWP or configured/indicated BWP) if no activity is associated with the second BWP. The wireless device may, based on a configured time delay after receiving an indication to switch BWPs (or identifying that a threshold time has elapsed), switch BWPs after the configured time delay has elapsed.

For example, a UE may monitor for and/or receive PDSCH and/or transmit PUSCH on the new BWP at a slot n+$T_{BWPswitchDelay}$, where the slot n is a slot associated with at least one of receiving the unicast DCI indicating the BWP switch or identifying that the BWP inactivity timer has expired. In some aspects, the wireless device may not be expected, and may not, transmit or receive communication during a BWP switching.

In some aspects of wireless communication associated with an MBS, a wireless device in a connected state (e.g., an RRC connected state) may be associated with a common frequency resource (CFR) for multicast or broadcast (where multicast and broadcast may be referred to, collectively, as groupcast or with reference to the MBS in the discussion below). For example, one CFR for a multicast may be configured in a DL dedicated BWP via unicast RRC signaling. In some aspects, a PDCCH configuration for the multicast may be configured via one or more of a CORESET (e.g., may be configured in a PDCCH-Config-Multicast information element (IE) or field). In some aspects, a SearchSpaceMulticast IE or field in the PDCCH-Config-Multicast IE or field may indicate a Type3-CSS with configurable priority. The PDCCH configuration for the multicast, in some aspects, may be configured via a SearchSpaceMulticast IE or field in a DCI (e.g., a multicast DCI format 4_1 and/or 4_2). In some aspects, a PDSCH configuration for multicast may be associated with frequency division multiplexing (FDM), or intra-slot time division multiplexing (TDM) with multicast and/or other PDSCHs subject to the FDM and/or TDM capabilities of the wireless device. Rate matching of multicast PDSCH, may be performed in some aspects.

When receiving multicast PDSCH scheduled by a multicast DCI (e.g., a DCI format 4_2) in PDCCH with cyclic redundancy check (CRC) scrambled by a group-radio network temporary identifier (G-RNTI) or a group configured-scheduling RNTI (G-CS-RNTI) with a new data indicator (NDI) equal to 1, if the UE is configured with a pdsch-AggregationFactor in a pdsch-Config-Multicast associated with the corresponding G-RNTI or in an associated SPS-Config-Multicast activated by the multicast DCI (e.g., a DCI format 4_2) with CRC scrambled by G-CS-RNTI, the same symbol allocation is applied across the pdsch-Aggregation-Factor consecutive slots. When receiving PDSCH scheduled by multicast DCI (e.g., a DCI format 4_2) for multicast reception in PDCCH with CRC scrambled by G-CS-RNTI with NDI equal to 0, or PDSCH without corresponding PDCCH transmission using an associated SPS-Config-Multicast and activated by the multicast DCI (e.g., a DCI format 4_2) in PDCCH with CRC scrambled by G-CS-RNTI, the same symbol allocation is applied across the pdsch-AggregationFactor, in an associated SPS-Config-Multicast if configured consecutive slots or 1 slot if not configured. When receiving PDSCH scheduled by a multicast DCI (e.g., DCI format 4_0) in PDCCH with CRC scrambled by G-RNTI for a multicast traffic channel (MTCH), if the UE is configured with pdsch-AggregationFactor in the pdsch-Config-Broadcast, the same symbol allocation is applied across the pdsch-AggregationFactor consecutive slots.

When receiving PDSCH scheduled by DCI in PDCCH with CRC scrambled by G-CS-RNTI for multicast reception or G-RNTI, if the DCI field 'Time domain resource assignment' indicates an entry which contains repetitionNumber in PDSCH-TimeDomainResourceAllocation in the PDSCH-Config-Multicast or PDSCH-Config-Broadcast, the same start and length indicator value (SLIV) is applied for all PDSCH transmission occasions across the repetitionNumber consecutive slots. When receiving PDSCH scheduled without corresponding PDCCH transmission using an associated SPS-Config-Multicast and activated by DCI in PDCCH with CRC scrambled by G-CS-RNTI for multicast reception, if the DCI field 'Time domain resource assignment' of the activating DCI indicates an entry which contains repetitionNumber in PDSCH-TimeDomainResourceAllocation in the PDSCH-Config-Multicast, the same SLIV is applied for all PDSCH transmission occasions across the repetitionNumber consecutive slots.

In downlink resource allocation of type 1 scheduled using a multicast DCI (e.g., a DCI format 4_0 or DCI format 4_1) with CRC scrambled by G-RNTI, or G-CS-RNTI or multicast control channel RNTI (MCCH-RNTI), the resource block assignment information indicates to a scheduled UE a set of contiguously allocated non-interleaved or interleaved virtual resource blocks. In some aspects, the set of contiguously allocated non-interleaved or interleaved virtual resource blocks may indicate the size of CORESET 0 if CORESET 0 is configured for the cell and the size of an initial DL bandwidth part may be used if CORESET 0 is not configured for the cell. A downlink type 1 resource block assignment field in the multicast DCI (e.g., a DCI format 4_0 or DCI format 4_1), in some aspects, may include a resource indicator value (RIV) corresponding to a starting resource block in reference to the lowest RB of the CFR is given by the size of CORESET 0 if CORESET 0 is configured for the cell or by the size of initial DL bandwidth part if CORESET 0 is not configured for the cell.

A UE may monitor one or more CORESETs while in an RRC inactive or RRC idle state. As an example, a non-MBS UE may monitor one or 2 CORESETs in an RRC idle or RRC inactive state, e.g., the non-MBS UE may not be required to monitor more than two CORESETs in the idle or inactive. The UE may monitor for CORESET0 for SIB and/or paging. The UE may monitor for a CORESET configured in SIB1. In some aspects, a broadcast UE may similarly monitor one or more CORESETs in the RRC idle or RRC inactive state. For example, the broadcast UE may monitor CORESET0 and either a CORESET configured in an SIB1 or a CORESET for broadcast that is configured in CFR-ConfigMCCH-MTCH, e.g., if a CORESET is not configured in SIB1. In some aspects, an MBS UE in an RRC inactive state may monitor more than 2 CORESETs, e.g., which may include one or more of the CORESET 0 for SIB/paging/broadcast, the CORESET configured in SIB1, or the CORESET for broadcast configured in CFR-ConfigMCCH-MTCH. In some aspects, one or multiple CORESETs for the multicast may be configured in the multicast CFR. In some aspects, a maximum number of CORESETs to be monitored in an RRC inactive state may be subject to UE capability. In some aspects, if the number of CORESETs for multicast in a connected state may be larger than a threshold, and a UE may select the CORESETs to monitor such as from a lowest CORESET ID.

A UE may monitor one or more search space sets in an RRC inactive or RRC idle state. For example, for a cell such as a PCell, a UE may monitor a Type 0 SS set, a Type 0A SS set, a Type 0B SS set, a Type 1 SS set, a Type 2 SS set, a Type 2A SS set, and/or a CSS. Type 0 or Type 0A may be for reception of SIB. Type 0B-CSS may be for reception of broadcasts. Type 1 may be for random access. Type 2 may be for paging. Type 2A may be for a paging early indicator (PEI). In some aspects, a multicast UE in an RRC inactive state may monitor a Type 3 CSS for multicast on a PCell.

A network may communicate with a UE using one or more types of DCI formats. Examples of DCI formats for UEs in an RRC inactive state may include DCI format 1_0 for SIB, paging, and random access; DCI format 4_0 that may be configured for broadcast; and/or DCI format 2_7 for a PEI. Multicast UEs in an RRC inactive state may monitor DCI format 4_1 (e.g., without monitoring for other DCI formats), DCI formats 4_1 and 4_2, or DCI format 4_0 with a G-RNTI for multicast.

Figure 4A:
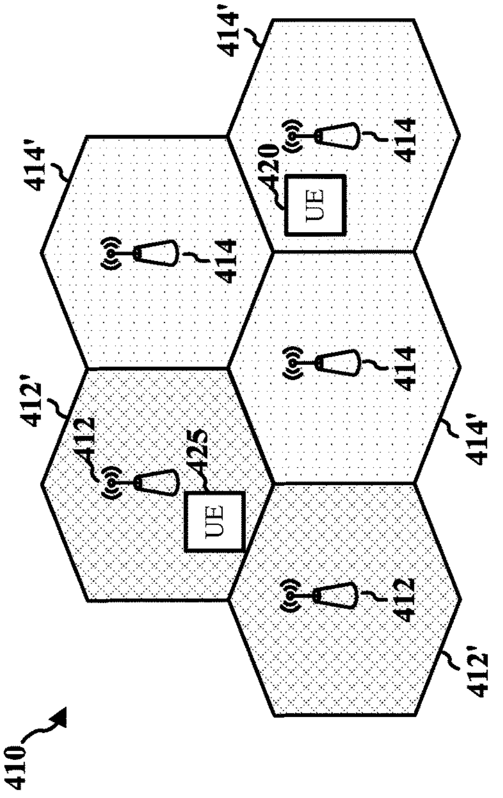
FIG. 4A is a diagram illustrating an example of MBS areas in an access network.

Some wireless communication systems may support broadcast communication, such as MBS. FIG. 4A is a diagram 410 illustrating an example of MBS areas in an access network. The base stations 412 (or TRP) in cells 412' may form a first MBS area and the base stations 414 in cells 414' may form a second MBS area. The base stations 412 and 414 may each be associated with other MBS areas. A cell within an MBS area may be designated a reserved cell. Reserved cells may not provide multicast/broadcast content, but may be time-synchronized to the cells 412', 414' and may have restricted power on MBS resources in order to limit interference to the MBS areas. Each base station in an MBS area synchronously transmits the same MBS control information and data. Each area may support broadcast, multicast, and unicast services. A unicast service is a service intended for a specific user, e.g., a voice call to a particular UE. A multicast service is a service that may be received by a group of users and may also be referred to as a groupcast, e.g., a subscription video service. A broadcast service is a service that may be received by any user within the coverage area, e.g., a news broadcast. Referring to FIG. 4A, the first MBS area may support a first MBS broadcast service, such as by providing a particular news broadcast to UE 425. The second MBS area may support a second MBS broadcast service, such as by providing a different news broadcast to UE 420.

Figure 4B:
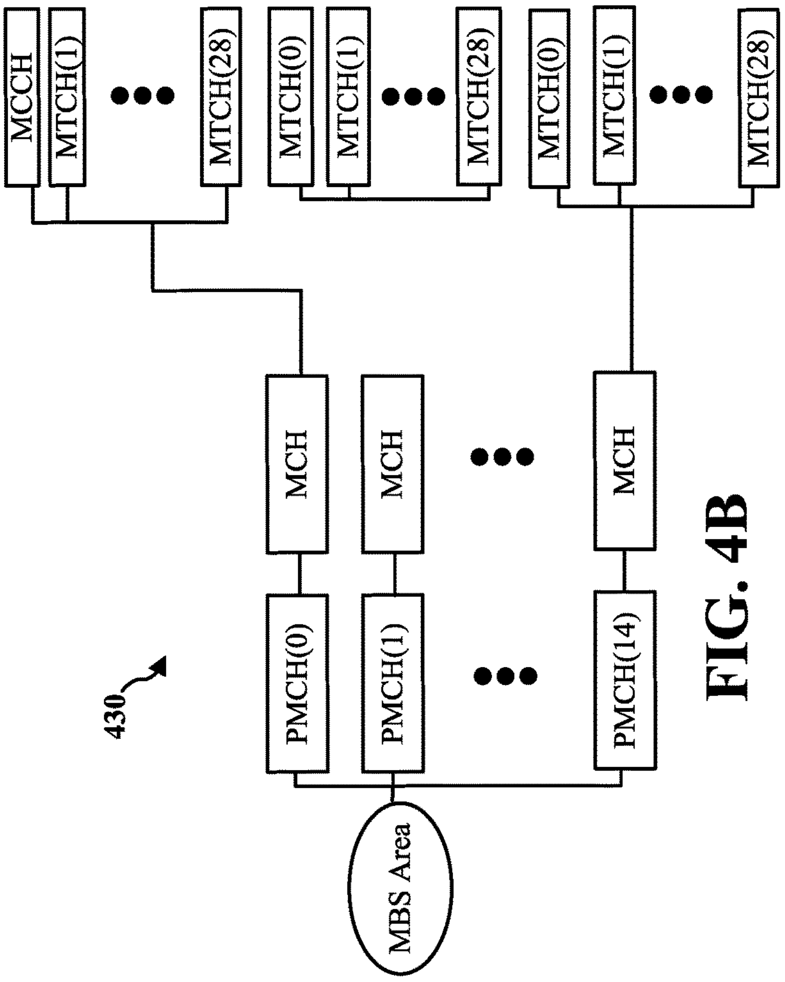
FIG. 4B is a diagram illustrating an example of an MBS channel configuration in an MBS.

FIG. 4B is a diagram 430 illustrating an example of an MBS channel configuration in an MBS. As shown in FIG. 4B, each MBS area supports one or more physical multicast channels (PMCH) (e.g., 15 PMCHs). Each PMCH corresponds to an MCH. Each MCH can multiplex a plurality (e.g., 29) of multicast logical channels. Each MBS area may have one MCCH. As such, one MCH may multiplex one MCCH and a plurality of MTCHs and the remaining MCHs may multiplex a plurality of MTCHs.

A UE can camp on a cell to discover the availability of MBS service access and a corresponding access stratum configuration. Initially, the UE may acquire an SIB that includes information that enables the UE to acquire an MBS area configuration message on an MCCH. Subsequently, based on the MBS area configuration message, the UE may acquire an MCH Scheduling Information (MSI) medium access control-control element (MAC-CE). The SIB may include an MBS area identifier of each MBS area supported by the cell and information for acquiring the MCCH. There may be one MBS area configuration message for each MBS area. The MBS area configuration message may indicate a temporary mobile group identity (TMGI) and an optional session identifier of each MTCH identified by a logical channel identifier within the PMCH and allocated resources in time and/or frequency for each PMCH of the MBS area. A particular TMGI identifies a particular service of available MBS services.

Figure 5:
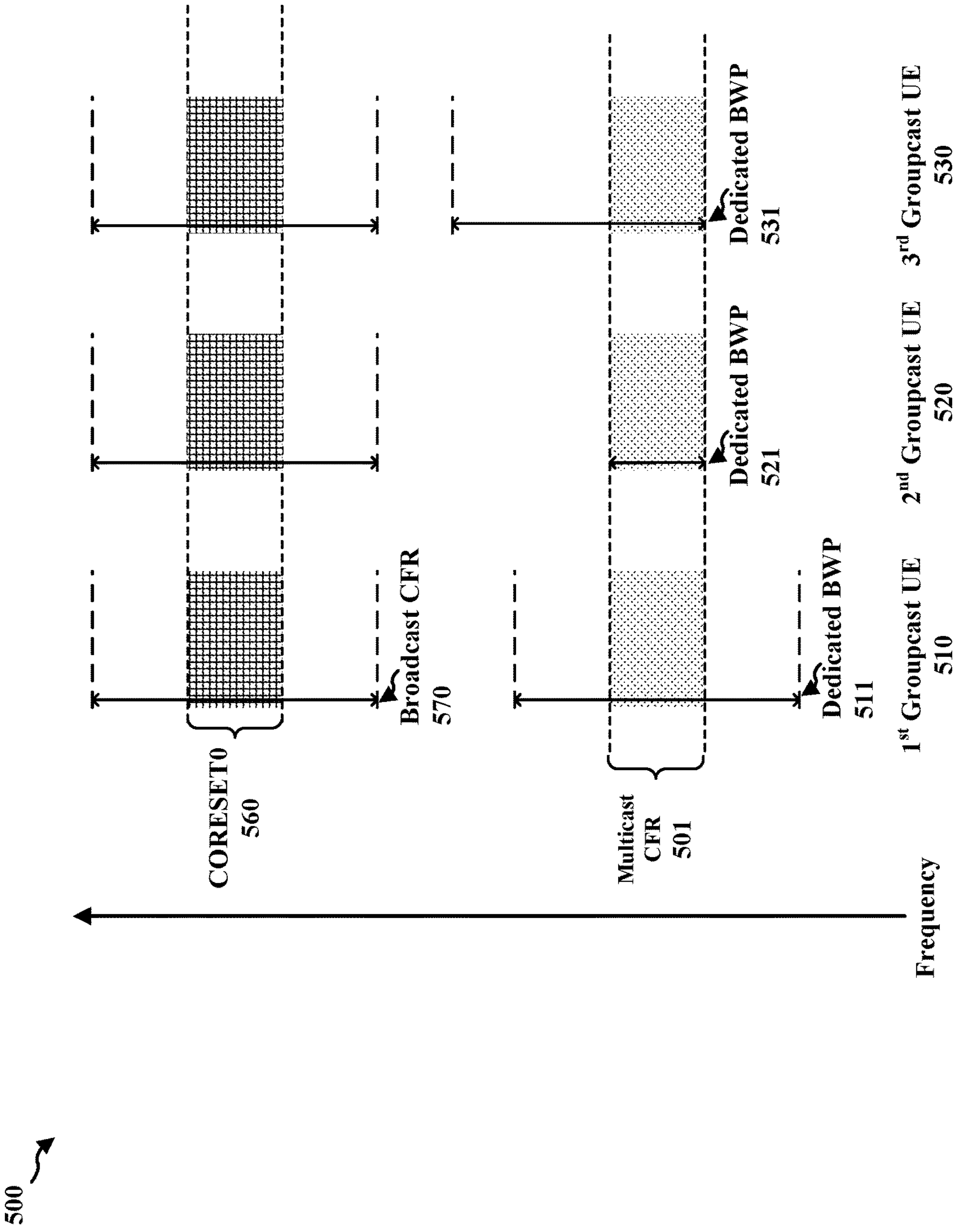
FIG. 5 is a diagram illustrating shared frequency resources for broadcast and multicast for a plurality of UEs in accordance with some aspects of the disclosure.

FIG. 5 is a diagram 500 illustrating shared frequency resources (e.g., CFRs) for broadcast and multicast for a plurality of UEs in accordance with some aspects of the disclosure. In some aspects, separate UE capabilities for multicast and broadcast may be defined for a UE capable of multicast in a connected state (e.g., an RRC connected state). A multicast CFR 501 (e.g., a single CFR associated with a plurality of UEs in a multicast group), in some aspects, may be configured in a DL dedicated BWP via unicast RRC signaling, with a BW that is a same size (e.g., spans a same set of frequency resources) or that is smaller than (e.g., spans a subset of frequency resources of) the DL dedicated BWP. For example, the dedicated BWP 511 or the dedicated BWP 531 may be larger than the multicast CFR 501 while the dedicated BWP 521 may be the same size as the multicast CFR 501. The multicast CFR 501, in some aspects, may be configured with a same numerology as the DL dedicated BWP. In some aspects, a multicast UE (e.g., one of the first groupcast UE 510, the second groupcast UE 520, or the third groupcast UE 530, collectively, groupcast UEs 510, 520, and 530) or the multicast CFR 501 may support HARQ-ACK feedback and/or slot-level repetition to improve reliability.

In some aspects, a broadcast CFR 570 may be defined, or configured, for the groupcast UEs 510, 520, and 530. The groupcast UEs 510, 520, and 530 may be in one of a connected, inactive, or idle state (e.g., RRC_CONNECTED, INACTIVE, or IDLE states). For example, the broadcast CFR 570 associated with a broadcast MCCH/MTCH can be configured via SIB20, with a BW that is the same as, or larger than, CORESET0 560 and associated with a same numerology as CORESET0 560. The broadcast CFR 570, in some aspects, may support slot-level repetition to improve reliability but may not support HARQ-ACK feedback.

Figure 6:
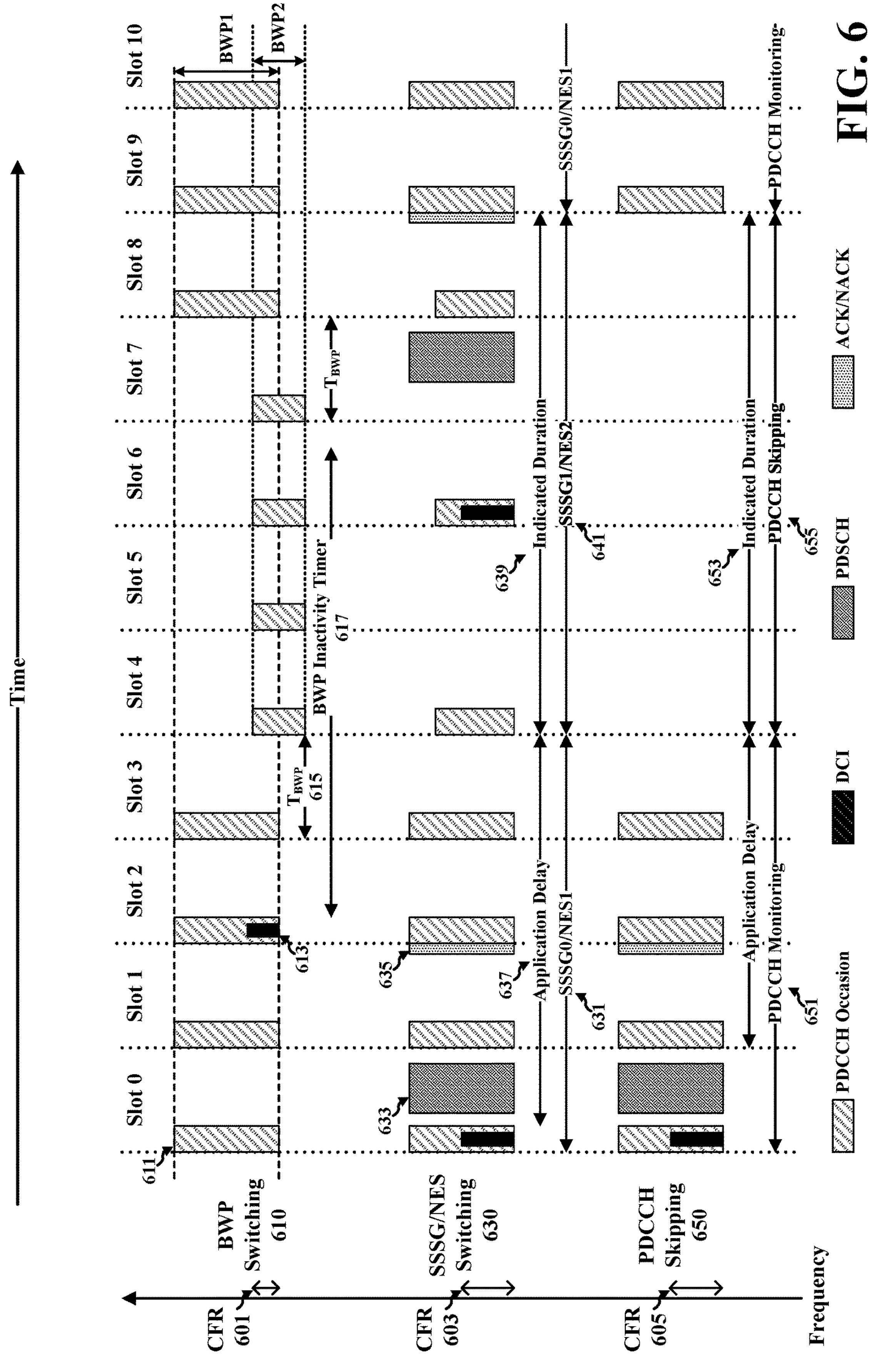
FIG. 6 is a set of timing diagrams associated with a set of switching operations in accordance with some aspects of the disclosure.

FIG. 6 is a set of timing diagrams associated with a set of switching operations (e.g., DCI monitoring behavior switching) in accordance with some aspects of the disclosure. For example, the network can send a DCI for multiple UEs, e.g., as a groupcast or multicast on a CFR. As an example, the DCI may be a group common DCI, in some aspects. FIG. 6 illustrates a first BWP switching operation 610, a second SSSG/NES switching operation 630, and a third PDCCH skipping operation 650 as examples of DCI-monitoring-behavior switching. While the discussion of the SSSG/NES switching operation 630 focuses on SSSG switching associated with skipping monitoring of PDCCH occasions, in some aspects, the switching may be between other NES techniques or NES modes of operation associated with a particular NES technique based on other ways to reduce energy consumption.

In some aspects, for the BWP switching operation 610, during a first time period (e.g., the time period including slots 0-3) a plurality of groupcast UEs may monitor for DCI in a PDCCH occasion 611 within a CFR 601 associated with a first BWP (e.g., BWP1) and, in some aspects, with a second BWP (e.g., BWP2). The plurality of groupcast UEs may receive a DCI 613 (e.g., as an example of a common dynamic indication for a plurality of groupcast UEs) in a PDCCH occasion associated with the first BWP indicating for the plurality of groupcast UEs to switch from the first BWP, BWP1, to the second BWP, BWP2, for a set of PDCCH occasions. In some aspects, the first BWP switching operation 610 may be associated with a PCell switching operation where the first BWP, BWP1, is associated with a first PCell and the second BWP, BWP2, is associated with the second PCell. In some aspects, the second BWP may be smaller (e.g., may include, or span, fewer frequency resources) than the first BWP in order to reduce a power consumption associated with PDCCH monitoring.

For example, the plurality of groupcast UEs may monitor, or stay in, a wider/larger BWP when receiving TBs and may switch (e.g., based on DCI 613 or based on an expiration of an inactivity time similar to the BWP inactivity time 617) to a smaller/narrower BWP after a burst of data finishes until a next burst starts. The start of a next burst may be determined or identified based on an indicated duration between bursts of data, scheduling information for the next burst received via the smaller/narrower BWP, an inactivity timer, or other known or configured times associated with the data bursts. Similarly, the plurality of groupcast UEs may monitor, or stay in, the smaller/narrower BWP when not expecting to receive TBs and may switch (e.g., based on a DCI (not shown) similar to DCI 613 or based on an expiration of the BWP inactivity time 617) to the wider/larger BWP for a next burst of data.

The DCI 613 may be transmitted by a base station, and received by the plurality of groupcast UEs, during a detection slot (e.g., slot 2 in which the DCI is detected). Based on receiving the DCI 613, the plurality of groupcast UEs may begin monitoring the second BWP indicated in the DCI 613 in a subsequent, switching, slot (e.g., slot 4) following the detection slot by a configured time delay (e.g., $T_{BWP}$ 615). Similarly, the groupcast UE may switch back to the first BWP in an additional switching slot (e.g., slot 8) following, by the configured time delay, an expiration slot (e.g., slot 6 during which the BWP inactivity time 617 expires). The configured time delay may be one of an offset time, an activation time, or a time delay specified as a number of slots or milliseconds. The configured time delay, in some aspects, may be a known time delay or a time delay configured via an RRC (or MAC) message. In some aspects, the plurality of groupcast UEs may be configured to perform the BWP switching right after a PDSCH transmission finishes based on a received indication of an end of a data burst (e.g., an "end of extended reality (XR) burst indication"). Additionally, or alternatively, the switching to the wider/larger BWP (e.g., BWP1) may be done autonomously based on a configured period and/or periodicity (and may be associated with a special handling for retransmissions spanning "modes" or times associated with both the wider/larger BWP and the narrower/smaller BWP). The common dynamic indication for the plurality of groupcast UEs associated with the BWP switching operation 610, in some aspects, may alternatively, or additionally, be associated with RRC or MAC signaling.

In some aspects, for the SSSG/NES switching operation 630, plurality of groupcast UEs may monitor for DCI within a CFR 603 in a set of PDCCH occasions associated with a first SSSG/NES (e.g., SSSG0/NES1 631) during a first time period (e.g., a time period including slots 0-3). The PDCCH occasions may be associated with a CFR for the plurality of groupcast UEs associated with a groupcast (e.g., a multicast or broadcast). The plurality of groupcast UEs may receive a DCI, e.g., the DCI in slot 0, indicating for the plurality of groupcast UEs to switch from monitoring the first SSSG/NES to monitoring a second SSSG/NES (e.g., SSSG1/NES2 641). A received DCI (e.g., the DCI received in slot 0 or 6) may further schedule a PDSCH (e.g., PDSCH 633 in slot 0, or the PDSCH in slot 7, respectively) and may also be associated with a feedback resource 635 (e.g., for a HARQ ACK/NACK) in a subsequent slot (e.g., slot 1 and 8, respectively). In some aspects, the second SSSG/NES may be associated with fewer (less frequent) PDCCH occasions and/or smaller (spanning, or including, fewer time-and-frequency resources) PDCCH occasions than the first SSSG/NES in order to reduce a power consumption associated with PDCCH monitoring. For example, the plurality of groupcast UEs may monitor, or be associated with, a larger SSSG/NES when receiving TBs and may switch (e.g., based on the DCI in slot 0, an indicated duration similar to indicated duration 639, or based on an expiration of an inactivity time similar to the BWP inactivity time 617) to a smaller SSSG/NES after a burst of data finishes until a next burst starts. The start of a next burst may be determined or identified based on an indicated duration 639 between bursts of data, scheduling information (e.g., DCI) for the next burst received via the smaller SSSG/NES, an inactivity timer, or other known or configured times associated with the data bursts. Similarly, the plurality of groupcast UEs may monitor, or be associated with, the SSSG/NES when not expecting to receive TBs and may switch (e.g., based on a DCI such as the DCI in slot 6 that may indicate the switch and/or to schedule a PDSCH similar to the DCI in slot 0, based on the expiration of the indicated duration 639, or based on an expiration an SSSG/NES inactivity time similar to the BWP inactivity time 617) to the larger SSSG/NEW for a next burst of data.

The DCI in slot 0 for the SSSG/NES switching operation 630 may be transmitted by a base station, and received by the plurality of groupcast UEs, during a detection slot (e.g., slot 0 in which the DCI is detected). Based on receiving the DCI, the plurality of groupcast UEs may begin monitoring the second SSSG/NES indicated in the DCI in a subsequent, switching, slot (e.g., slot 4) following the detection slot by a configured time delay (e.g., application delay 637 which, in some aspects, may be defined as a time beginning at a slot that is at least a configured number of symbols from the last symbol of the DCI). Similarly, the plurality of groupcast UEs may switch back to the first SSSG/NES in an additional switching slot (e.g., slot 9) following a slot at the end of an indicated duration 639 (where the indicated duration 639 may include a first indicated time/duration that, when added to the application delay 637 may be equal to the indicated duration 639). Alternatively, or additionally, the plurality of groupcast UEs may switch (after the expiration of the application delay 637) to a default SSSG/NES based on the expiration of an inactivity timer (not shown).

In some aspects, at the first slot after switching to the second SSSG, the plurality of groupcast UEs may set an SSSG switching timer (e.g., set a timer counter value). The timer, in some aspects, may be reset after a slot that the plurality of groupcast UEs detects a DCI format with CRC scrambled by one of C-RNTI, CS-RNTI, MCS-C-RNTI (e.g., for unicast PDCCH). If the plurality of groupcast UEs does not detect a DCI format with CRC scrambled by one of C-RNTI, CS-RNTI, MCS-C-RNTI in a slot, the timer is decreased by one after each such slot. If the at least one groupcast UE monitors PDCCH associated with one of a first, or second, non-default SSSG and the timer expires (e.g., a timer counter value reaches zero), the plurality of groupcast UEs may begin monitoring PDCCH occasions associated with a first, default, SSSG (e.g., an SSSG0 or SSSG #0) after an application delay (e.g., the application delay 637). In some aspects, multiple non-default SSSGs may be configured for a particular BWP and the SSSG switching time (e.g., the timer counter value) may be configured to apply for each SSSG associated with the particular BWP. The timer counter value may be specified based on a set of candidate counter values for an associated SCS and/or numerology, e.g., for a 15 kHz SCS the candidate counter values may include $\{1, 2, 3, \ldots, 20, 30, \ldots, 60, 80, 100\}$ slots while for a 60 kHz SCS the candidate counter values may include $\{1, 2, 3, \ldots, 80, 120, \ldots, 240, 320, 400\}$ slots with other SCS having similarly structured candidate values.

As discussed above, the configured time delay (e.g., application delay 637) may be one of an offset time, an activation time, or a time delay specified as a number of symbols, slots, or milliseconds. The configured time delay, in some aspects, may be a known time delay or a time delay configured via an RRC (or MAC) message. In some aspects, the plurality of groupcast UEs may be configured to perform the SSSG/NES switching right after a PDSCH transmission finishes based on a received indication of an end of a data burst (e.g., an “end of XR burst indication” that may function as the indication for the plurality of groupcast UEs to switch SSSG/NES in the DCI in slot 0 described above). Additionally, or alternatively, the switching to the larger (or smaller) SSSG/NES may be done autonomously based on a configured period and/or periodicity (and may be associated with a special handling for retransmissions spanning “modes” or times associated with both the wider/larger BWP and the narrower/smaller BWP). The common dynamic indication for the plurality of groupcast UEs associated with the SSSG/NES switching operation 630, in some aspects, may alternatively, or additionally, be associated with RRC or MAC signaling.

In some aspects, for the PDCCH skipping operation 650, the plurality of groupcast UEs may monitor for DCI within a CFR 605 in a set of PDCCH occasions associated with a current SSSG/NES (e.g., SSSG0/NES1) during a first time period (e.g., a PDCCH monitoring period 651 including slots 0-3). The PDCCH occasions may be associated with a CFR for the plurality of groupcast UEs associated with a groupcast (e.g., a multicast or broadcast). The plurality of groupcast UEs may receive a DCI, e.g., the DCI in slot 0, indicating for the plurality of groupcast UEs to switch from monitoring the PDCCH occasions associated with the current SSSG/NES to skipping monitoring for an indicated duration 653 (e.g., for a PDCCH skipping period 655). A received DCI (e.g., the DCI received in slot 0) may further schedule a PDSCH (e.g., the PDSCH in slot 0) and may also be associated with a feedback resource (e.g., for a HARQ ACK/NACK similar to feedback resource 635) in a subsequent slot (e.g., slot 1). For example, the plurality of groupcast UEs may monitor PDCCH occasions when receiving TBs and may switch (e.g., based on the DCI in slot 0, an indicated duration for the PDCCH monitoring period 651 similar to indicated duration 653 for the PDCCH skipping period 655, or based on an expiration of an inactivity time similar to the BWP inactivity time 617) to omitting (or skipping) monitoring PDCCH occasions after a burst of data finishes until a next burst starts. The start of a next burst may be determined or identified based on an indicated duration 653 between bursts of data, scheduling information (e.g., DCI) for the next burst received via other PDCCH resources and/or occasions that are monitored during PDCCH skipping period 655, an inactivity timer, or other known or configured times associated with the data bursts. For example, in some aspects, DCI monitoring associated with some search spaces (e.g., Type0/0A/1/2 CSS or a wake up signal (WUS), such as a DCI format 2_6 for a Type3 CSS outside a discontinuous reception (DRX) active time) may not be affected by the PDCCH skipping (or the SSSG/NES switching) indicated by the DCI in slot 0. Similarly, the plurality of groupcast UEs may skip, or omit, monitoring PDCCH occasions associated with a current SSSG/NES when not expecting to receive TBs and may switch (e.g., based on a DCI that may indicate the switch, based on the expiration of the indicated duration 653, or based on an expiration an SSSG/NES inactivity time similar to the BWP inactivity time 617) to monitoring the PDCCH occasions associated with the current SSSG/NEW for a next burst of data.

The DCI in slot 0 for the PDCCH skipping operation 650 may be transmitted by a base station, and received by the plurality of groupcast UEs, during a detection slot (e.g., slot 0 in which the DCI is detected). Based on receiving the DCI, the plurality of groupcast UEs may skip monitoring the PDCCH occasions during the PDCCH skipping period 655 indicated in the DCI beginning at a subsequent, switching, slot (e.g., slot 4) following the detection slot by a configured time delay (e.g., an application delay similar to application delay 637 which, in some aspects, may be defined as a time beginning at a slot that is at least a configured number of symbols, or slots, from the last symbol, or a slot including the last symbol, of the DCI). Similarly, the plurality of groupcast UEs may switch back to monitoring the PDCCH occasions for the current SSSG/NES in an additional switching slot (e.g., slot 9) following a slot at the end of an indicated duration 653 (where the indicated duration 653 may include a first indicated time/duration that, when added to the application delay may be equal to the indicated duration 653). Alternatively, or additionally, the plurality of groupcast UEs may switch (after the expiration of the application delay) to a default SSSG/NES based on the expiration of an inactivity timer (not shown). As discussed above, the configured time delay may be one of an offset time, an activation time, or a time delay specified as a number of symbols, slots, or milliseconds. The configured time delay, in some aspects, may be a known time delay or a time delay configured via an RRC (or MAC) message.

In some aspects, a PDCCH skipping may be configured with up to 3 values of a skip duration ‘X’ from which an indicated duration may be selected. The 3 values for X may be selected from a list of candidate skip duration values that are specific to a particular SCS or numerology, e.g., for a 15 kHz SCS the candidate skip duration values may include {1, 2, 3, . . . , 20, 30, . . . , 60, 80, 100} slots while for a 60 kHz SCS the candidate skip duration values may include {1, 2, 3, . . . , 80, 120, . . . , 240, 320, 400} slots with other SCS having similarly structured candidate skip duration values. In some aspects, the supported values of X may be associated with a skipping duration of up to 100 ms. The PDCCH skipping duration configuration, in some aspects, may be per-BWP.

In some aspects, the plurality of groupcast UEs may be configured to perform the SSSG/NES switching right after a PDSCH transmission finishes based on a received indication of an end of a data burst (e.g., an “end of XR burst indication” that may function as the indication for the plurality of groupcast UEs to skip, or omit, monitoring PDCCH occasions in the DCI in slot 0 described above). Additionally, or alternatively, the switching to skipping, or omitting, monitoring the PDCCH occasions may be done autonomously based on a configured period and/or periodicity (and may be associated with a special handling for retransmissions spanning “modes” or times associated with both the wider/larger BWP and the narrower/smaller BWP). The common dynamic indication for the plurality of groupcast UEs associated with the PDCCH skipping operation 650, in some aspects, may alternatively, or additionally, be associated with RRC or MAC signaling.

While the discussion of FIG. 6 describes the different switching operations independently, in some aspects, multiple switching indications may overlap and be applied in combination. When multiple switching indications overlap, the functions and/or timing described above may be modified. For example, when an SSSG switch to a non-default SSSG overlaps with a PDCCH skipping, the expiration of an SSSG timer associated with switching back to a default SSSG may be associated with switching back to the default SSSG at a time (or slot) that is no earlier than (1) an application delay (e.g., a known or configured number of symbols) after the slot where the timer expires and (2) the end of indicated duration 653 associated with the PDCCH skipping period 655. In some aspects, during an application delay (associated with either of a DCI-based indication or a timer expiration), the plurality of groupcast UEs may not expect to, and may not, receive additional DCI indicating a different SSSG or PDCCH skipping.

Figure 7A:
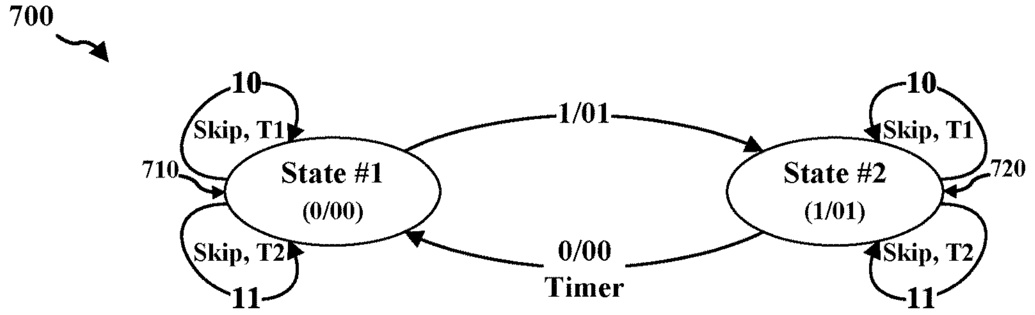
FIG. 7A is a diagram illustrating a set of two states and state transitions associated with a set of codepoints for a groupcast UE in accordance with some aspects of the disclosure.

FIG. 7A is a diagram 700 illustrating a set of two states and state transitions associated with a set of codepoints for a groupcast UE in accordance with some aspects of the disclosure. The codepoints, in some aspects, may be included in control information and may be used to identify an indicated state (e.g., an SSSG) from a set of two states (e.g., a first state 710, state #1, that may correspond to a default SSSG such as an SSSG0 or SSSG #0 and a second state 720, state #2, that may correspond to a non-default SSSG such as an SSSG1 or SSSG #1). For example, referring to the codepoint table 730, a single-bit codepoint may indicate the first state 710, state #1, using a first value (e.g., a value of "0") of the single bit codepoint while indicating a second state 720, state #2, using a second value (e.g., a value of "1") of the single bit codepoint. In some aspects, a PDCCH skip (and/or a PDCCH skip duration) may also be indicated by the codepoints. For example, if a 2-bit codepoint is used, the first state may be indicated by a first value of the 2-bit codepoint (e.g., "00") and the second state may be indicated by a second value of the 2-bit codepoint (e.g., "01") while the two other possible codepoints (e.g., "10" and "11") may each correspond to one of a first PDCCH skipping of a first duration, a second PDCCH skipping of a second duration, or a reserved codepoint (e.g., a codepoint "10" may be associated with a PDCCH skipping duration of T1 and a codepoint "11" may be associated with a PDCCH skipping duration of T2 or the codepoint "11" may be a reserved codepoint). Diagram 700 further illustrates that a transition from the second state to the first state may be associated with one of a codepoint (e.g., a single bit codepoint value of 0 or a 2-bit codepoint value of 00, represented in the diagram 700 as "0/00") or a timer expiration as described above in relation to FIG. 6 (e.g., represented in the diagram 700 as "Timer").

Figure 7B:
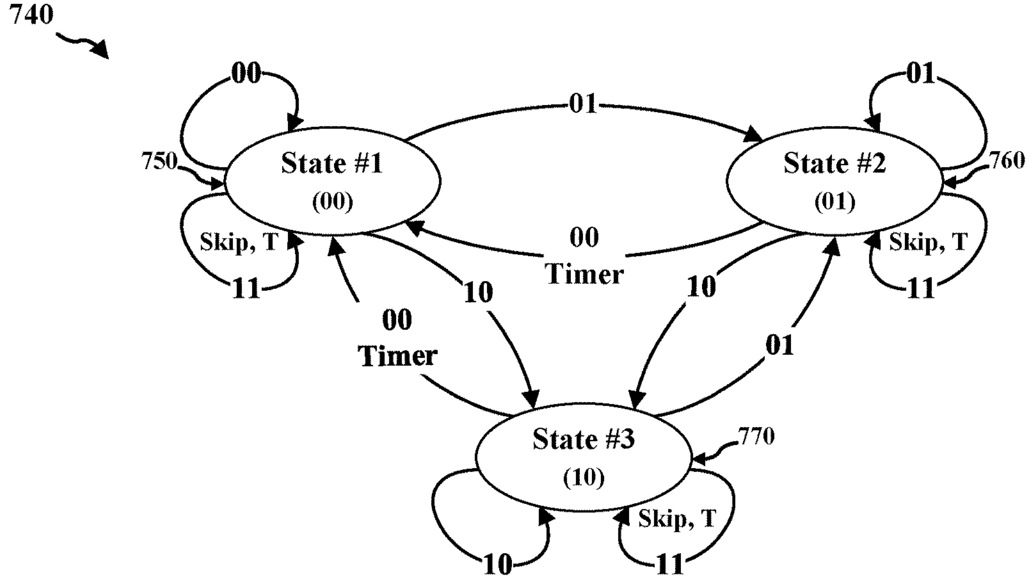
FIG. 7B is a diagram illustrating a set of three states and state transitions associated with a set of codepoints for a groupcast UE in accordance with some aspects of the disclosure.

FIG. 7B is a diagram 740 illustrating a set of three states and state transitions associated with a set of codepoints for a groupcast UE in accordance with some aspects of the disclosure. The codepoints, in some aspects, may be used to identify a state (e.g., an SSSG) from a set of three states (e.g., a first state 750, state #1, that may correspond to a default SSSG such as an SSSG0 or SSSG #0, a second state 760, state #2, that may correspond to a non-default SSSG such as an SSSG1 or SSSG #1, and a third state 770, state #3, that may correspond to a non-default SSSG such as an SSSG2 or SSSG #2). In some aspects, a PDCCH skip may also be indicated by the codepoints. For example, referring to the codepoint table 780, if a 2-bit codepoint is used, the first state may be indicated by a first value of the 2-bit codepoint (e.g., "00"), the second state may be indicated by a second value of the 2-bit codepoint (e.g., "01"), and the third state may be indicated by a third value of the 2-bit codepoint (e.g., "10") while the other possible codepoint (e.g., "11") may correspond to one of a first PDCCH skipping of a particular duration (e.g., a codepoint "11" may be associated with a PDCCH skipping duration of T) or a reserved codepoint (e.g., a codepoint "11" may be a reserved codepoint). Diagram 740 further illustrates that a transition from the second state or the third state to the first state may be associated with one of a codepoint (e.g., a 2-bit codepoint value of 00) or a timer expiration as described above in relation to FIG. 6 (e.g., represented in the diagram 740 as "Timer").

Figure 8:
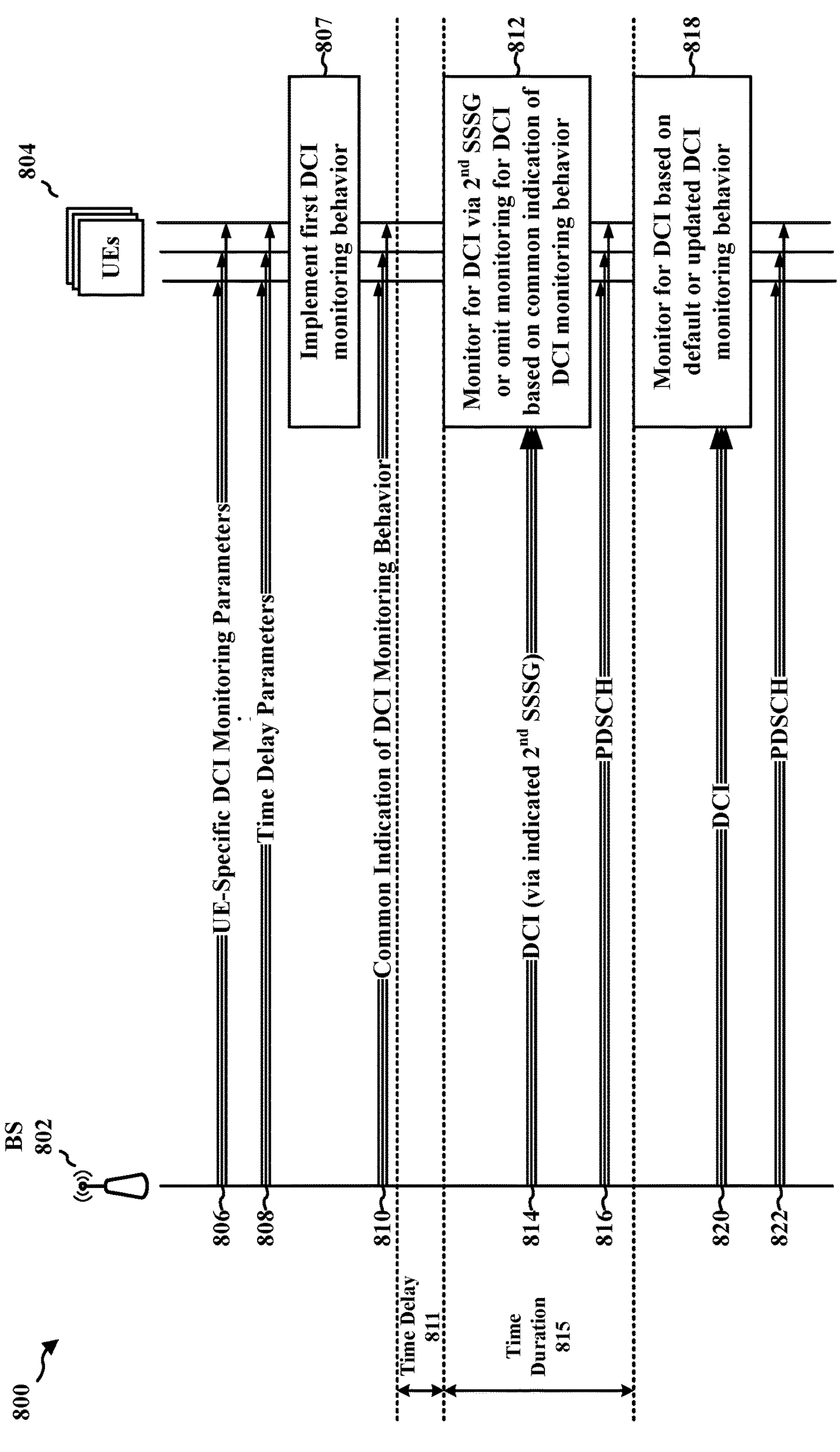
FIG. 8 is a call flow diagram illustrating the use of a common dynamic indication to indicate a DCI monitoring behavior for a plurality of UEs in accordance with some aspects of the disclosure.

FIG. 8 is a call flow diagram 800 illustrating the use of a common dynamic indication to indicate a DCI monitoring behavior for a plurality of UEs in accordance with some aspects of the disclosure. The base station 802 (e.g., as an example of a network device or network node that may include one or more components of a disaggregated base station) may transmit, and a plurality of UEs 804 (e.g., as an example of a wireless device) may receive, one or more UE-specific DCI monitoring parameters 806. The functions ascribed to the base station 802, in some aspects, may be performed by one or more components of a network node or a network device (a single network device/node or a disaggregated network device/node as described above in relation to FIG. 1). Similarly, the functions ascribed to the plurality of UEs 804, in some aspects, may be performed by one or more components of a wireless device supporting communication with a network device/node. Accordingly, references to "transmitting" in the description below may be understood to refer to a first component of the base station 802 (or the plurality of UEs 804) outputting (or providing) an indication of the content of the transmission to be transmitted by a different component of the base station 802 (or the plurality of UEs 804). Similarly, references to "receiving" in the description below may be understood to refer to a first component of the base station 802 (or the plurality of UEs 804) receiving a transmitted signal and outputting (or providing) the received signal (or information based on the received signal) to a different component of the base station 802 (or the plurality of UEs 804).

In some aspects, the transmission(s) associated with the one or more UE-specific DCI monitoring parameters 806 may be one of unicast transmissions or a multicast/broadcast transmission. The one or more UE-specific DCI monitoring parameters 806, in some aspects, may include an indication of one or more CFRs associated with an MBS and/or one or more groupcast (e.g., multicast and/or broadcast) groups. In some aspects, the one or more UE-specific DCI monitoring parameters 806 may include an indication of one or more SSSG configurations, SSSG identifiers (e.g., one or more identifiers associated with a corresponding known or configured SSSG configuration), and/or a duration associated with one or more of a PDCCH skipping operation or a SSSG switching operation.

The base station 802 may transmit, and the plurality of UEs 804 may receive, a set of one or more time delay parameters 808 relating to a time between receiving an indication of, or detecting a trigger for, a (change to) DCI monitoring behavior and implementing the indicated DCI monitoring behavior. For a common indication of DCI monitoring behavior associated with a plurality of CCs including at least a first CC associated with a first numerology and a second CC associated with a second numerology that is higher than the first numerology, the time delay may be defined (or specified) in terms of a number of symbols (or slots) associated with one of the first numerology or the second numerology. The time delay (e.g., the set of one or more time delay parameters 808), in some aspects, may be transmitted and/or received in at least one of RRC signaling, a MAC-CE, or an additional DCI. In some aspects, the set of one or more time delay parameters 808 may be included in a transmission associated with the one or more UE-specific DCI monitoring parameters 806.

At a first time, the plurality of UEs 804 may implement, at 807, a first DCI monitoring behavior. For example, the plurality of UEs 804 may implement, at 807, one of a default DCI monitoring behavior, or a non-default DCI monitoring behavior, associated with one or more multicast and/or broadcast groups and/or transmissions. A default DCI monitoring behavior implemented at 807, in some aspects, may be associated with a default SSSG.

While implementing the first DCI monitoring behavior at 807, the base station 802 may transmit, and the plurality of UEs 804 may receive, a common indication of DCI monitoring behavior 810 for the plurality of UEs 804. In contrast to an SIB broadcast for all wireless devices in communication with a base station (such as base station 802), the common indication of DCI monitoring behavior 810 (e.g., as an example of a common dynamic indication) may be transmitted via a monitoring occasion (e.g., time-and-frequency resources identified as candidates for transmitting control information) monitored by a particular group of UEs (e.g., UEs associated with a particular multicast or groupcast). In some aspects, the common indication of DCI monitoring behavior 810 may be included in one of a scheduling DCI (e.g., DCI that allocates/schedules resources for transmission or reception such as for one or more of a PDCCH, PDSCH, MCCH, or MTCH transmission or reception) or a non-scheduling DCI (e.g., DCI that carries control information but does not allocate/schedule resources for transmission or reception). The common indication of DCI monitoring behavior 810, in some aspects, may be transmitted and/or received via one of at least one of RRC signaling, a MAC-CE, or an additional DCI. In some aspects, the common indication of DCI monitoring behavior 810 may be transmitted and/or received as a groupcast, multicast, or a broadcast transmission or message via the CFR. In some aspects, different types of common dynamic indications (e.g., common indication of DCI monitoring behavior 810) for different DCI monitoring behavior may be associated with one or more of: different RNTIs, different CORESET within the frequency resource that is common to the plurality of wireless devices (e.g., the CFR associated with the plurality of UEs 804), or different search spaces within the frequency resource that is common to the plurality of wireless devices.

The DCI monitoring behavior indicated in the common indication of DCI monitoring behavior 810, in some aspects, may be associated with one of an SSSG switching, a PDCCH (monitoring) skipping, or a mode of operation (e.g., a sleep mode) associated with an end of a burst of wireless (groupcast) traffic. A sleep mode, in some aspects, may include a period of reduced activity that may be associated with omitting monitoring for PDCCH during the period of reduced activity along with omitting, deactivating, or disabling other functions of the wireless device (e.g., a UE in the plurality of UEs 804) to conserve power, or reduce power consumption. In some aspects, the common indication of DCI monitoring behavior 810 may be associated with a BWP switching or a PCell switching.

For example, the common indication of DCI monitoring behavior 810, in some aspects, may be associated with switching from monitoring a first SSSG to monitoring a second SSSG. The first SSSG, in some aspects, may be a default SSSG (or a first non-default SSSG) and the second SSSG may be a non-default SSSG (or a second non-default SSSG) or vice versa. In some aspects, the switching from monitoring the first SSSG to monitoring the second SSSG may be indicated for one or more of: unicast resources for each of the UEs in the plurality of UEs 804 (e.g., including at least a first wireless device or UE), an indicated CFR, a set of CFRs, or each CFR associated with the UE or the plurality of UEs 804. The common indication of DCI monitoring behavior 810, in some aspects, may further indicate a time period (or duration) to apply an indicated SSSG switching.

Similarly, the common indication of DCI monitoring behavior 810, in some aspects, may be associated with omitting (or skipping) monitoring of indicated PDCCH resources. The indicated PDCCH resources may include one or more of: unicast PDCCH resources for each of the UEs in the plurality of UEs 804 (e.g., including at least a first wireless device or UE), an indicated CFR, a set of CFRs, or each CFR. The common indication of DCI monitoring behavior 810, in some aspects, may indicate specific PDCCH occasions for which to omit (or skip) monitoring or, in some aspects, may alternatively, or additionally, indicate a time period (or duration) to apply an indicated PDCCH monitoring omitting (or skipping). Alternatively, or additionally, the indicated DCI monitoring behavior is associated with entering into a sleep mode for an indicated amount of time in association with an end of a burst of data and/or traffic (e.g., data associated with an XR application).

After the indicated time delay 811 from the transmission and/or reception of the common indication of DCI monitoring behavior 810, the plurality of UEs 804 may begin monitoring, at 812, for DCI based on the behavior indicated in the common indication of DCI monitoring behavior 810. In some aspects, the time delay 811 may be a minimum time (e.g., $T_{BWP}$ 615, or an application delay 637) between receiving the common indication of DCI monitoring behavior 810 and implementing an indicated DCI monitoring behavior. The time delay 811, in some aspects, may be an amount of time indicated for applying the indicated DCI monitoring behavior that is at least the minimum time.

As described above, the monitoring at 812 may include monitoring, based on the indicated DCI monitoring behavior, for a DCI via the frequency resource common to the plurality of wireless devices (the CFR). The monitoring behavior may be associated with one of monitoring a second SSSG, omitting monitoring of the indicated PDCCH (e.g., indicated in the common indication of DCI monitoring behavior 810), or entering a sleep mode associated with an end of a burst of wireless (groupcast) traffic (e.g., for an XR application or other application associated with traffic that tends to be received in bursts of data separated by relatively long periods with no data exchanged and/or inactivity). In some aspects, the monitoring behavior beginning at 812 may be associated with a switch from a first PCell associated with the first DCI monitoring behavior implemented at 807 to an indicated second PCell. The monitoring behavior beginning at 812, in some aspects, may be associated with a switch to monitoring an indicated second BWP that is different from a first monitored BWP associated with the first DCI monitoring behavior implemented at 807. As described above, DCI monitoring behavior beginning (or implemented) at 812, in some aspects, may be associated with one or more of: unicast (PDCCH) resources for each of the UEs in the plurality of UEs 804 (e.g., including at least a first wireless device or UE), an indicated CFR, a set of CFRs, or each CFR associated with the UE or the plurality of UEs 804.

While monitoring for DCI based on the behavior indicated in the common indication of DCI monitoring behavior 810, the base station 802 may transmit, and the plurality of UEs 804 may receive, DCI 814 via a monitored PDCCH occasion. For example, the DCI 814 may be associated with the second SSSG, a PDCCH occasion for which the common indication of DCI monitoring behavior 810 does not indicate to omit (or skip) monitoring, the second BWP, or the second PCell indicated in the common indication of DCI monitoring behavior 810. In such aspects for which the DCI 814 is associated with a monitored PDCCH occasion, the base station 802 may transmit, and the plurality of UEs 804 may receive, PDSCH 816 associated with, or scheduled via, DCI 814. In some aspects, the plurality of UEs 804 may omit the reception of DCI 814 based on the common indication of DCI monitoring behavior 810 (e.g., based on an indication to omit monitoring or to enter a sleep mode or reduced activity mode) and may accordingly, omit reception of (or not monitor for) the PDSCH 816.

The monitoring behavior beginning at 812 may be associated with one of an indicated time duration for implementation (or application) or may be associated with an inactivity timer or other triggering condition or event indicating for the behavior indicated in common indication of DCI monitoring behavior 810 to end. For example, the common indication of DCI monitoring behavior 810 may include an indication of an inactivity time such as BWP inactivity time 617 or an indication of an indicated duration such as indicated duration 639, or may include an indication that the application of the behavior indicated in the common indication of DCI monitoring behavior 810 be implemented until a subsequent indication. In some aspects, the indication of the associated time duration may be based on a known or configured value or values (a known set of values associated with skipping as described above in relation to at least FIG. 7A or a configured inactivity timer configured during a configuration operation). For example, a subsequent indication may be included in DCI 814 or may be transmitted and/or received via a subsequent signal or message, e.g., an additional DCI or a MAC-CE (or some other layer 1 or layer 2 message, not shown).

Based on the indicated time, the DCI monitoring behavior beginning at 812 may be associated with a time duration 815 that is based on one of an indicated duration, an indicated (or known) inactivity timer, or a reception of a subsequent indication of a new DCI monitoring behavior to implement. In some aspects, multiple DCI monitoring behaviors may be indicated for application during overlapping time periods, such that the behavior during the time duration 815, in some aspects, may be associated with multiple different DCI monitoring behaviors indicated in one or more common indications of DCI monitoring behavior. For example, a first indication may indicate a first SSSG switching behavior for a first time duration, while a second indication may indicate omitting PDCCH monitoring (or a BWP switch) for a second time duration that partially overlaps the first time duration such that during a first time period within time duration 815 the plurality of UEs 804 may monitor the second SSSG without omitting PDCCH monitoring (or in association with a first BWP) based on the first indication, while during a second time period within the time duration 815, the plurality of UEs 804 may omit monitoring the second SSSG (or monitor the second SSSG for the second BWP) based on the second indication.

After the time duration 815, the plurality of UEs 804 may implement, at 818, one or a default DCI monitoring behavior or an indicated (updated) DCI monitoring behavior (e.g., indicated in one of the common indication of DCI monitoring behavior 810 or a subsequent indication). While implementing the default (or updated) DCI monitoring behavior, the base station 802 may transmit, and the plurality of UEs 804 may receive, a DCI 820 during a monitored PDCCH occasion. The base station 802 may transmit, and the plurality of UEs 804 may receive, a PDSCH communication 822 associated with, or scheduled by, the DCI 820.

Figure 9:
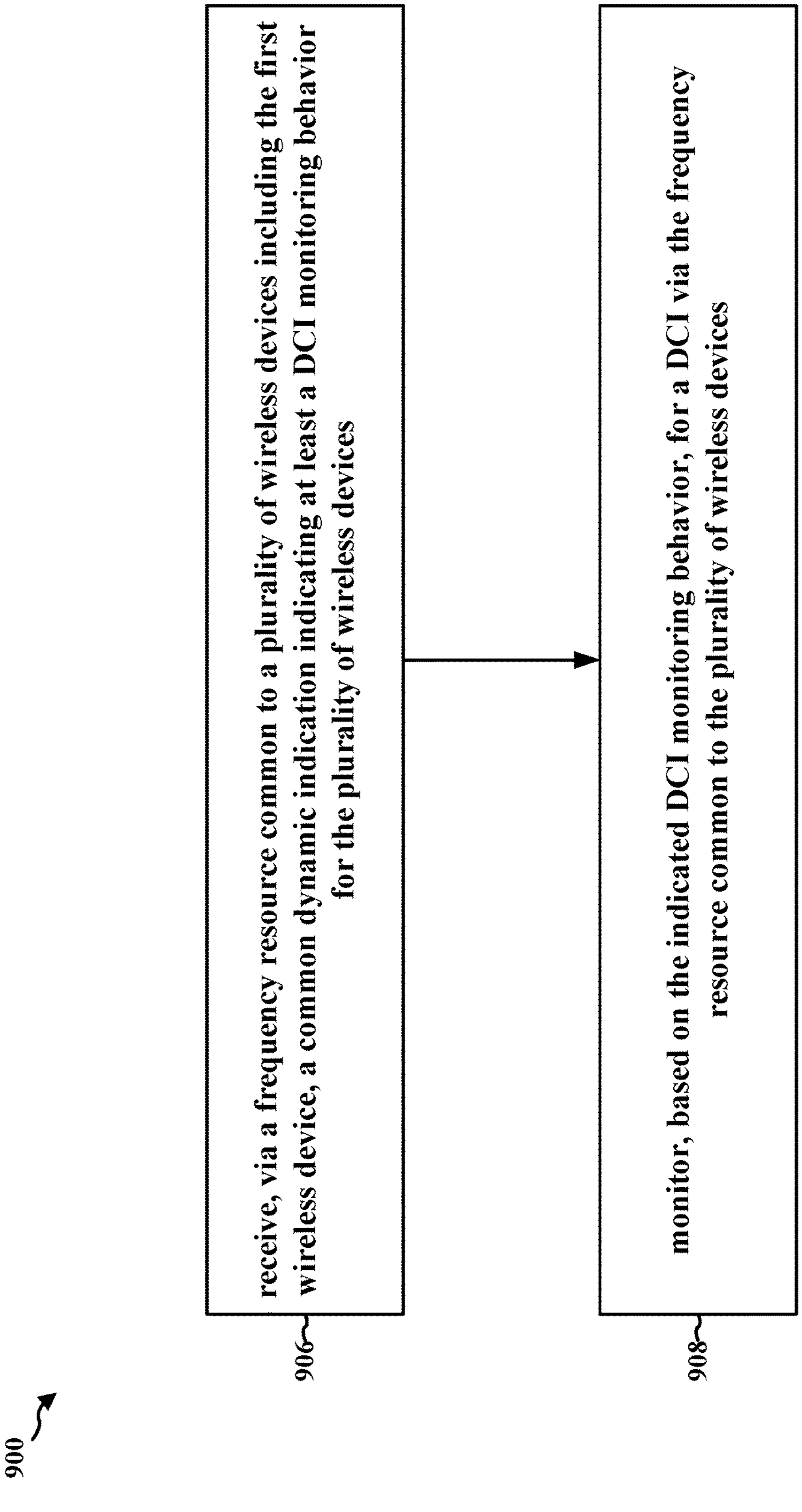
FIG. 9 is a flowchart of a method of wireless communication.

FIG. 9 is a flowchart 900 of a method of wireless communication. The method may be performed by a wireless device such as a UE (e.g., the UE 104, 420, 425; the groupcast UEs 510, 520, 530; the plurality of UEs 804; the apparatus 1304). In some aspects, the UE (a first wireless device in a plurality of wireless devices or UEs) may receive a set of UE-specific parameters for omitting monitoring of (subsequently) indicated PDCCH resources. In some aspects, the set of UE-specific parameters may include a set of SSSG identifiers and a duration associated with omitting monitoring of the indicated PDCCH resources. The set of UE-specific parameters, in some aspects, may be received before receiving a common dynamic indication indicating at least one DCI monitoring behavior for a plurality of UEs (wireless devices) including the UE and the set of UE-specific parameters may be used (e.g., referenced or indexed into) to indicate the at least one DCI monitoring behavior. For example, referring to FIGS. 6, 7A, 7B, and 8, the base station 802 may transmit, and the plurality of UEs 804 may receive, the one or more UE-specific DCI monitoring parameters 806 that may include the parameters associated with the first BWP switching operation 610 (e.g., an indication of BWP1, BWP2, the $T_{BWP}$ 615, the BWP inactivity time 617), the SSSG/NES switching operation 630 (e.g., an indication of the resources associated with SSSG0/NES1, SSSG1/NES2, the application delay 637, a default value for the indicated duration 639), and the PDCCH skipping operation 650 (e.g., an application delay similar to application delay 637, a default value for the indicated duration 653 such as the value T illustrated in FIG. 7A, or a set of selectable durations for the indicated duration 653 such as the value T1 or T2 illustrated in FIG. 7B).

In some aspects, the UE may receive an indication of the time delay for applying the indicated DCI monitoring behavior. In some aspects, the indication of the time delay may be received in (or via) at least one of RRC signaling, a MAC-CE, or (additional) DCI. The time delay, in some aspects, may be indicated (e.g., defined or specified) as a number of symbols (or slots) after a last symbol of (or slot containing) DCI (or other signaling format or message) before applying (or implementing) the indicated DCI monitoring behavior. For a common dynamic indication (e.g., a common indication of DCI monitoring behavior) associated with a plurality of CCs including at least a first CC associated with a first numerology and a second CC associated with a second numerology that is higher than the first numerology, the time delay may be defined in terms of a number of symbols (or slots) associated with one of the first numerology or the second numerology. For example, referring to FIGS. 6, 7A, 7B, and 8, the base station 802 may transmit, and the plurality of UEs 804 may receive, the set of one or more time delay parameters 808 (e.g., the $T_{BWP}$ 615, the BWP inactivity time 617, the application delay 637, a default value for the indicated duration 639, an application delay similar to application delay 637 for omitting PDCCH monitoring, a default value for the indicated duration 653 such as the value T illustrated in FIG. 7A, or a set of selectable durations for the indicated duration 653 such as the value T1 or T2 illustrated in FIG. 7B).

At 906, the UE may receive, via a frequency resource common to a plurality of UEs (wireless devices) including the UE (the first wireless device), a common dynamic indication indicating at least a DCI monitoring behavior for the plurality of UEs (wireless devices). For example, 906 may be performed by application processor(s) 1306, cellular baseband processor(s) 1324, transceiver(s) 1322, antenna(s) 1380, and/or groupcast behavior modification component 198 of FIG. 13. In some aspects, the common dynamic indication indicating at least the DCI monitoring behavior for the plurality of UEs (wireless devices) may be included in one of a scheduling DCI or a non-scheduling DCI. The common dynamic indication, in some aspects, may be transmitted and/or received via one of at least one of RRC signaling, a MAC-CE, or an additional DCI. In some aspects, the common dynamic indication may be transmitted and/or received as a groupcast, multicast, or a broadcast transmission or message via the CFR. The DCI monitoring behavior indicated in the common dynamic indication, in some aspects, may be associated with one of an SSSG switching, a PDCCH (monitoring) skipping, or a mode of operation (e.g., a sleep mode) associated with an end of a burst of wireless (groupcast) traffic. In some aspects, the common dynamic indication may be associated with a BWP switching or a PCell switching. As described above, the DCI monitoring behavior indicated in the common dynamic indication, in some aspects, may be associated with one or more of: unicast (PDCCH) resources for each UE in the plurality of the UEs (e.g., including at least the UE or the first wireless device), an indicated CFR, a set of CFRs, or each CFR associated with the UE or the plurality of UEs (the first wireless device or the plurality of wireless devices). The common dynamic indication received at 906, in some aspects, may include an indication of an inactivity time, or an indication of an indicated duration, or may include an indication that the application of the behavior indicated in the common dynamic indication be implemented until a subsequent common dynamic indication is received. For example, referring to FIGS. 6, 7A, 7B, and 8, the base station 802 may transmit, and the plurality of UEs 804 may receive, the common indication of DCI monitoring behavior 810 indicating a DCI monitoring behavior for the UE (e.g., one or more of the first BWP switching operation 610, the NES switching operation 630, or the PDCCH skipping operation 650). For example, the common indication of DCI monitoring behavior 810 may indicate one of the state transitions between the first state 710 and the second state 720 (or between the first state 750, the second state 760, and the third state 770) or a PDCCH monitoring skipping or monitoring before returning to a same state, and may further indicate a time duration associated with the indicated DCI monitoring behavior as discussed above.

At 908, the UE may monitor, based on the indicated DCI monitoring behavior received at 906, for a DCI via the frequency resource common to the plurality of wireless devices. For example, 908 may be performed by application processor(s) 1306, cellular baseband processor(s) 1324, transceiver(s) 1322, antenna(s) 1380, and/or groupcast behavior modification component 198 of FIG. 13. In some aspects, the monitoring at 908 may include monitoring, based on the indicated DCI monitoring behavior, for a DCI via the frequency resource common to the plurality of wireless devices (the CFR). The monitoring behavior may be associated with one of monitoring a second SSSG, omitting monitoring of the indicated PDCCH (e.g., based on common dynamic indication received at 906), or entering a sleep mode associated with an end of a burst of wireless (groupcast) traffic (e.g., for an XR application or other application associated with traffic that tends to be received in bursts of data separated by relatively long periods with no data exchanged and/or inactivity). In some aspects, the monitoring at 908 may be associated with a switch from a first PCell to a second indicated PCell, where the first PCell may be associated with a first DCI monitoring behavior implemented before the monitoring at 908 based on the common dynamic indication received at 906 and the second PCell may be associated with the monitoring at 908 based on the common dynamic indication received at 906. The monitoring at 908, in some aspects, may be associated with a switch to monitoring an indicated second BWP that is different from a first monitored BWP associated with a first DCI monitoring behavior implemented before the monitoring at 908 based on the common dynamic indication received at 906. As described above, the monitoring at 908, in some aspects, may be associated with one or more of: unicast (PDCCH) resources for each UE in the plurality of the UEs (e.g., including at least the UE or the first wireless device), an indicated CFR, a set of CFRs, or each CFR associated with the UE or the plurality of UEs (the first wireless device or the plurality of wireless devices). The monitoring behavior that begins at 908 may be associated with one of an indicated time duration for implementation (or application) or may be associated with an inactivity timer or other triggering condition or event indicating an end time for the behavior indicated in the common dynamic indication received at 906. For example, referring to FIGS. 6, 7A, 7B, and 8, the plurality of UEs 804 may begin monitoring, at 812, for DCI based on the behavior indicated in the common indication of DCI monitoring behavior 810 (e.g., associated with one of the first BWP switching operation 610, the SSSG/NES switching operation 630, or the PDCCH skipping operation 650, or one of the state transitions between the first state 710 and the second state 720 illustrated in FIG. 7A or between the first state 750, the second state 760, and the third state 770 illustrated in FIG. 7B).

After the monitoring at 908, the UE may return to monitoring (or resume monitoring) a previously monitored set of (PDCCH) resources. For example, after the monitoring at 908, the UE may return to monitoring (or resume monitoring) the first SSSG, the PDCCH occasions, the first BWP, or resources associated with the first PCell. The first SSSG and/or the first BWP, in some aspects, may be a default SSSG or a default BWP. In some aspects, the UE may return to monitoring the previously monitored set of (PDCCH) resources (e.g., the first SSSG, the PDCCH occasions, the first BWP, the resources associated with the first PCell, or resources associated with an active (or awake) state) based on the indicated time duration for implementation (or application), an inactivity timer, or other triggering condition and/or event indicating an end time for the DCI monitoring behavior indicated in the common dynamic indication received at 906 and begun at 908. For example, referring to FIGS. 6, 7A, 7B, and 8, the plurality of UEs 804 may implement, at 818, a default DCI monitoring behavior or an indicated (updated) DCI monitoring behavior that may represent a return to monitoring a previously monitored set of (PDCCH) resources (e.g., returning to a monitoring behavior implemented in slots 0 to 3 at a slot 8, slot 9, or slot 9 associated with one of the first BWP switching operation 610, the SSSG/NES switching operation 630, or the PDCCH skipping operation 650, respectively, which may be reflected in the state transitions of FIGS. 7A and 7B).

Figure 10:
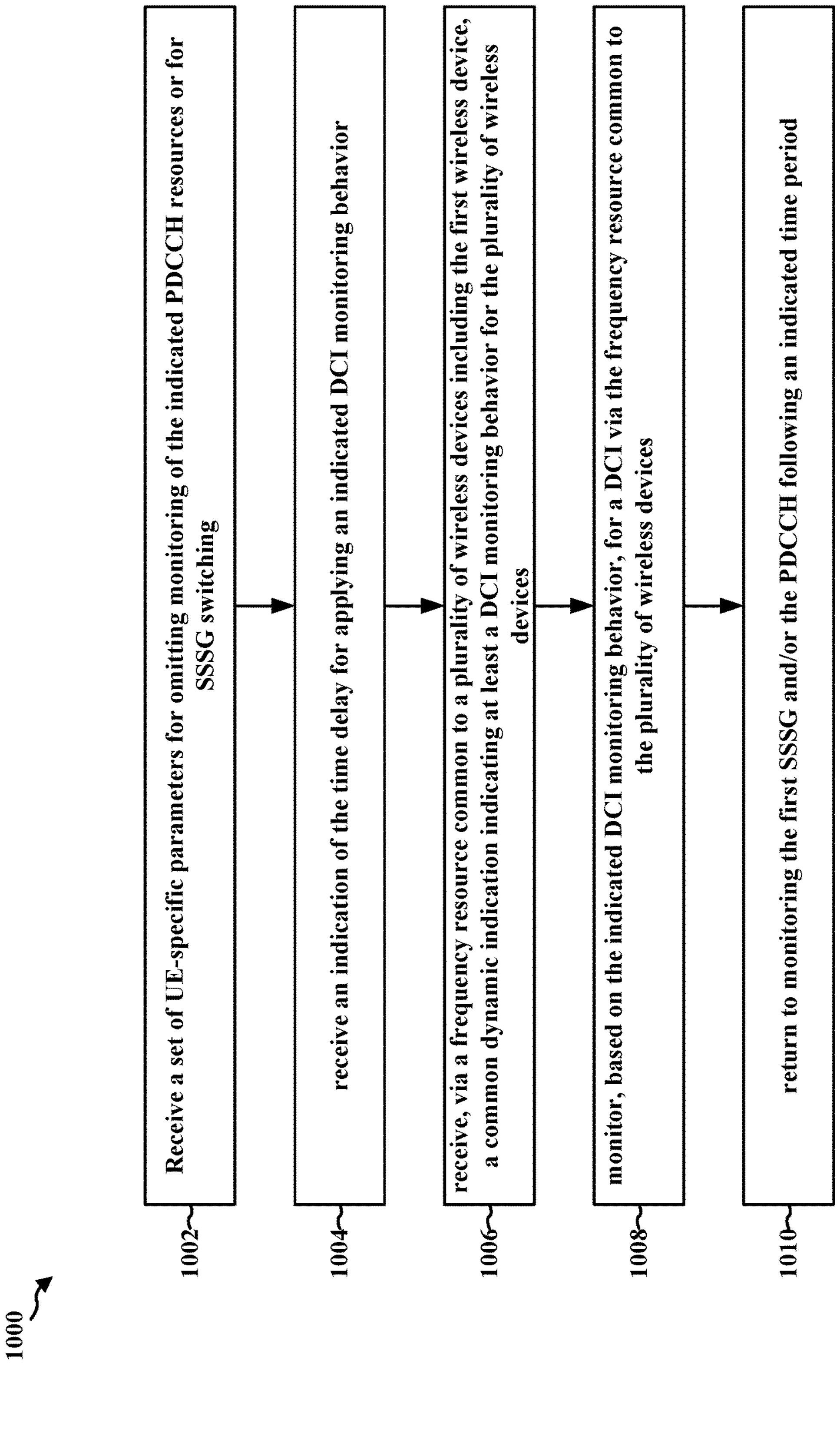
FIG. 10 is a flowchart of a method of wireless communication.

FIG. 10 is a flowchart 1000 of a method of wireless communication. The method may be performed by a wireless device such as a UE (e.g., the UE 104, 420, 425; the groupcast UEs 510, 520, 530; the plurality of UEs 804; the apparatus 1304). At 1002, the UE (a first wireless device in a plurality of wireless devices or UEs) may receive a set of UE-specific parameters for omitting monitoring of (subsequently) indicated PDCCH resources. For example, 1002 may be performed by application processor(s) 1306, cellular baseband processor(s) 1324, transceiver(s) 1322, antenna(s)

Figure 13:
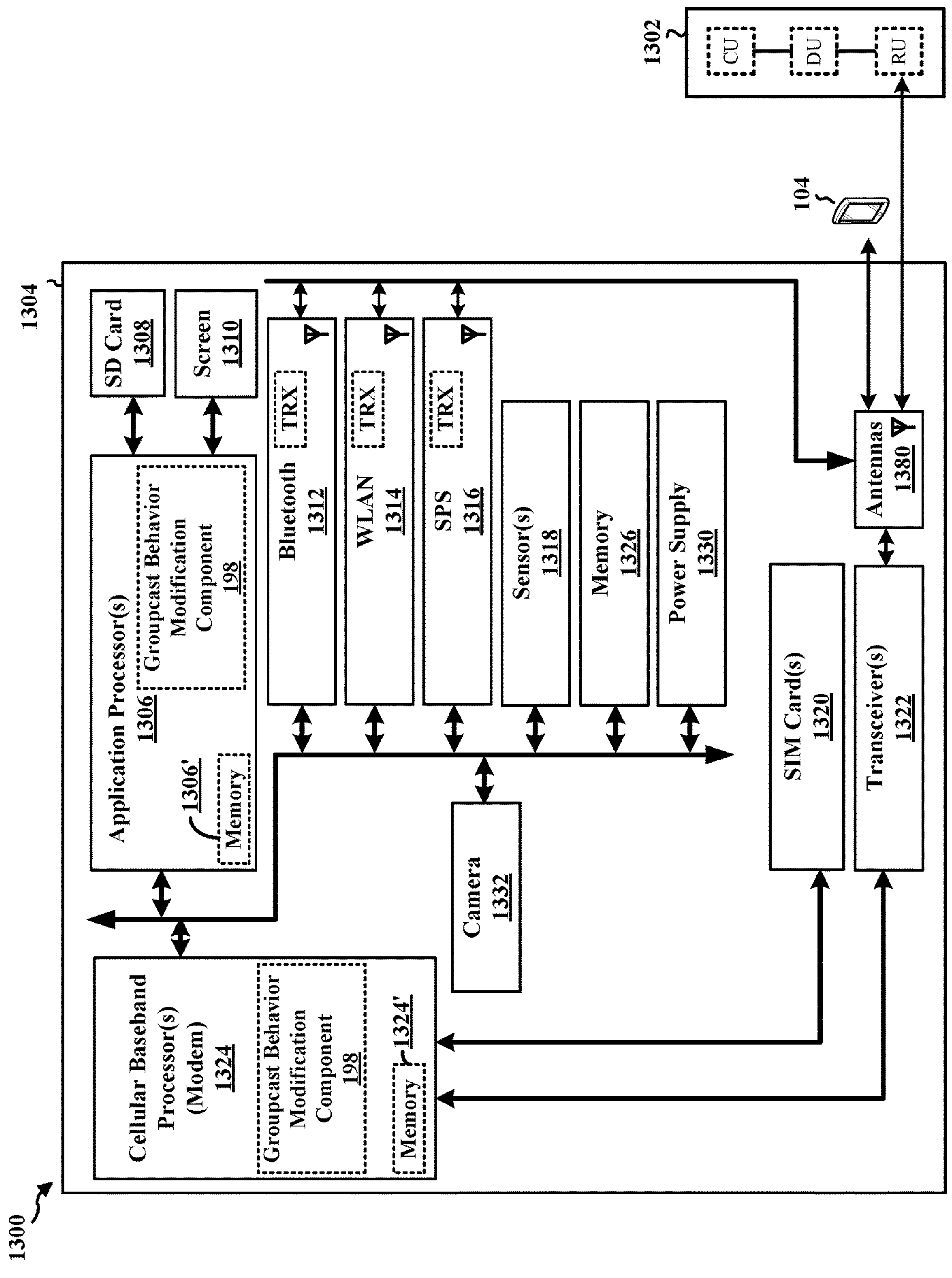
FIG. 13 is a diagram illustrating an example of a hardware implementation for an example apparatus and/or network entity.

1380, and/or groupcast behavior modification component 198 of FIG. 13. In some aspects, the set of UE-specific parameters may include a set of SSSG identifiers and a duration associated with omitting monitoring of the indicated PDCCH resources. The set of UE-specific parameters, in some aspects, may be received before receiving a common dynamic indication indicating at least one DCI monitoring behavior for a plurality of UEs (wireless devices) including the UE and the set of UE-specific parameters may be used (e.g., referenced or indexed into) to indicate the at least one DCI monitoring behavior. For example, referring to FIGS. 6, 7A, 7B, and 8, the base station 802 may transmit, and the plurality of UEs 804 may receive, the one or more UE-specific DCI monitoring parameters 806 that may include the parameters associated with the first BWP switching operation 610 (e.g., an indication of BWP1, BWP2, the $T_{BWP}$ 615, the BWP inactivity time 617), the SSSG/NES switching operation 630 (e.g., an indication of the resources associated with SSSG0/NES1, SSSG1/NES2, the application delay 637, a default value for the indicated duration 639), and the PDCCH skipping operation 650 (e.g., an application delay similar to application delay 637, a default value for the indicated duration 653 such as the value T illustrated in FIG. 7A, or a set of selectable durations for the indicated duration 653 such as the value T1 or T2 illustrated in FIG. 7B).

At 1004, the UE may receive an indication of the time delay for applying the indicated DCI monitoring behavior. For example, 1004 may be performed by application processor(s) 1306, cellular baseband processor(s) 1324, transceiver(s) 1322, antenna(s) 1380, and/or groupcast behavior modification component 198 of FIG. 13. In some aspects, the indication of the time delay may be received in (or via) at least one of RRC signaling, a MAC-CE, or (additional) DCI. The time delay, in some aspects, may be indicated (e.g., defined or specified) as a number of symbols (or slots) after a last symbol of (or slot containing) DCI (or other signaling format or message) before applying (or implementing) the indicated DCI monitoring behavior. For a common dynamic indication (e.g., a common indication of DCI monitoring behavior) associated with a plurality of CCs including at least a first CC associated with a first numerology and a second CC associated with a second numerology that is higher than the first numerology, the time delay may be defined in terms of a number of symbols (or slots) associated with one of the first numerology or the second numerology. For example, referring to FIGS. 6, 7A, 7B, and 8, the base station 802 may transmit, and the plurality of UEs 804 may receive, the set of one or more time delay parameters 808 (e.g., the $T_{BWP}$ 615, the BWP inactivity time 617, the application delay 637, a default value for the indicated duration 639, an application delay similar to application delay 637 for omitting PDCCH monitoring, a default value for the indicated duration 653 such as the value T illustrated in FIG. 7A, or a set of selectable durations for the indicated duration 653 such as the value T1 or T2 illustrated in FIG. 7B).

At 1006, the UE may receive, via a frequency resource common to a plurality of UEs (wireless devices) including the UE (the first wireless device), a common dynamic indication indicating at least a DCI monitoring behavior for the plurality of UEs (wireless devices). For example, 1006 may be performed by application processor(s) 1306, cellular baseband processor(s) 1324, transceiver(s) 1322, antenna(s) 1380, and/or groupcast behavior modification component 198 of FIG. 13. In some aspects, the common dynamic indication indicating at least the DCI monitoring behavior for the plurality of UEs (wireless devices) may be included in one of a scheduling DCI or a non-scheduling DCI. The common dynamic indication, in some aspects, may be transmitted and/or received via one of at least one of RRC signaling, a MAC-CE, or an additional DCI. In some aspects, the common dynamic indication may be transmitted and/or received as a groupcast, multicast, or a broadcast transmission or message via the CFR. The DCI monitoring behavior indicated in the common dynamic indication, in some aspects, may be associated with one of an SSSG switching, a PDCCH (monitoring) skipping, or a mode of operation (e.g., a sleep mode) associated with an end of a burst of wireless (groupcast) traffic. In some aspects, the common dynamic indication may be associated with a BWP switching or a PCell switching. As described above, the DCI monitoring behavior indicated in the common dynamic indication, in some aspects, may be associated with one or more of: unicast (PDCCH) resources for each UE in the plurality of the UEs (e.g., including at least the UE or the first wireless device), an indicated CFR, a set of CFRs, or each CFR associated with the UE or the plurality of UEs (the first wireless device or the plurality of wireless devices). The common dynamic indication received at 1006, in some aspects, may include an indication of an inactivity time, or an indication of an indicated duration, or may include an indication that the application of the behavior indicated in the common dynamic indication be implemented until a subsequent common dynamic indication is received. For example, referring to FIGS. 6, 7A, 7B, and 8, the base station 802 may transmit, and the plurality of UEs 804 may receive, the common indication of DCI monitoring behavior 810 indicating a DCI monitoring behavior for the UE (e.g., one or more of the first BWP switching operation 610, the SSSG/NES switching operation 630, or the PDCCH skipping operation 650). For example, the common indication of DCI monitoring behavior 810 may indicate one of the state transitions between the first state 710 and the second state 720 (or between the first state 750, the second state 760, and the third state 770) or a PDCCH monitoring skipping or monitoring before returning to a same state, and may further indicate a time duration associated with the indicated DCI monitoring behavior as discussed above.

At 1008, the UE may monitor, based on the indicated DCI monitoring behavior received at 1006, for a DCI via the frequency resource common to the plurality of wireless devices. For example, 1008 may be performed by application processor(s) 1306, cellular baseband processor(s) 1324, transceiver(s) 1322, antenna(s) 1380, and/or groupcast behavior modification component 198 of FIG. 13. In some aspects, the monitoring at 1008 may include monitoring, based on the indicated DCI monitoring behavior, for a DCI via the frequency resource common to the plurality of wireless devices (the CFR). The monitoring behavior may be associated with one of monitoring a second SSSG, omitting monitoring of the indicated PDCCH (e.g., based on common dynamic indication received at 1006), or entering a sleep mode associated with an end of a burst of wireless (groupcast) traffic (e.g., for an XR application or other application associated with traffic that tends to be received in bursts of data separated by relatively long periods with no data exchanged and/or inactivity). In some aspects, the monitoring at 1008 may be associated with a switch from a first PCell to a second indicated PCell, where the first PCell may be associated with a first DCI monitoring behavior implemented before the monitoring at 1008 based on the common dynamic indication received at 1006 and the second PCell may be associated with the monitoring at 1008 based on the common dynamic indication received at 1006. The monitoring at 1008, in some aspects, may be associated with a switch to monitoring an indicated second BWP that is different from a first monitored BWP associated with a first DCI monitoring behavior implemented before the monitoring at 1008 based on the common dynamic indication received at 1006. As described above, the monitoring at 1008, in some aspects, may be associated with one or more of: unicast (PDCCH) resources for each UE in the plurality of the UEs (e.g., including at least the UE or the first wireless device), an indicated CFR, a set of CFRs, or each CFR associated with the UE or the plurality of UEs (the first wireless device or the plurality of wireless devices). The monitoring behavior that begins at 1008 may be associated with one of an indicated time duration for implementation (or application) or may be associated with an inactivity timer or other triggering condition or event indicating an end time for the behavior indicated in the common dynamic indication received at 1006. For example, referring to FIGS. 6, 7A, 7B, and 8, the plurality of UEs 804 may begin monitoring, at 812, for DCI based on the behavior indicated in the common indication of DCI monitoring behavior 810 (e.g., associated with one of the first BWP switching operation 610, the SSSG/NES switching operation 630, or the PDCCH skipping operation 650, or one of the state transitions between the first state 710 and the second state 720 illustrated in FIG. 7A or between the first state 750, the second state 760, and the third state 770 illustrated in FIG. 7B).

At 1010, the UE may return to monitoring (or resume monitoring) a previously monitored set of (PDCCH) resources. For example, at 1010, the UE may return to monitoring (or resume monitoring) the first SSSG, the PDCCH occasions, the first BWP, or resources associated with the first PCell. The first SSSG and/or the first BWP, in some aspects, may be a default SSSG or a default BWP. For example, 1010 may be performed by application processor(s) 1306, cellular baseband processor(s) 1324, transceiver(s) 1322, antenna(s) 1380, and/or groupcast behavior modification component 198 of FIG. 13. In some aspects, the UE may return to monitoring the previously monitored set of (PDCCH) resources (e.g., the first SSSG, the PDCCH occasions, the first BWP, the resources associated with the first PCell, or resources associated with an active (or awake) state) based on the indicated time duration for implementation (or application), an inactivity timer, or other triggering condition and/or event indicating an end time for the DCI monitoring behavior indicated in the common dynamic indication received at 1006 and begun at 1008. For example, referring to FIGS. 6, 7A, 7B, and 8, the plurality of UEs 804 may implement, at 818, a default DCI monitoring behavior or an indicated (updated) DCI monitoring behavior that may represent a return to monitoring a previously monitored set of (PDCCH) resources (e.g., returning to a monitoring behavior implemented in slots 0 to 3 at a slot 8, slot 9, or slot 9 associated with one of the first BWP switching operation 610, the SSSG/NES switching operation 630, or the PDCCH skipping operation 650, respectively, which may be reflected in the state transitions of FIGS. 7A and 7B).

Figure 11:
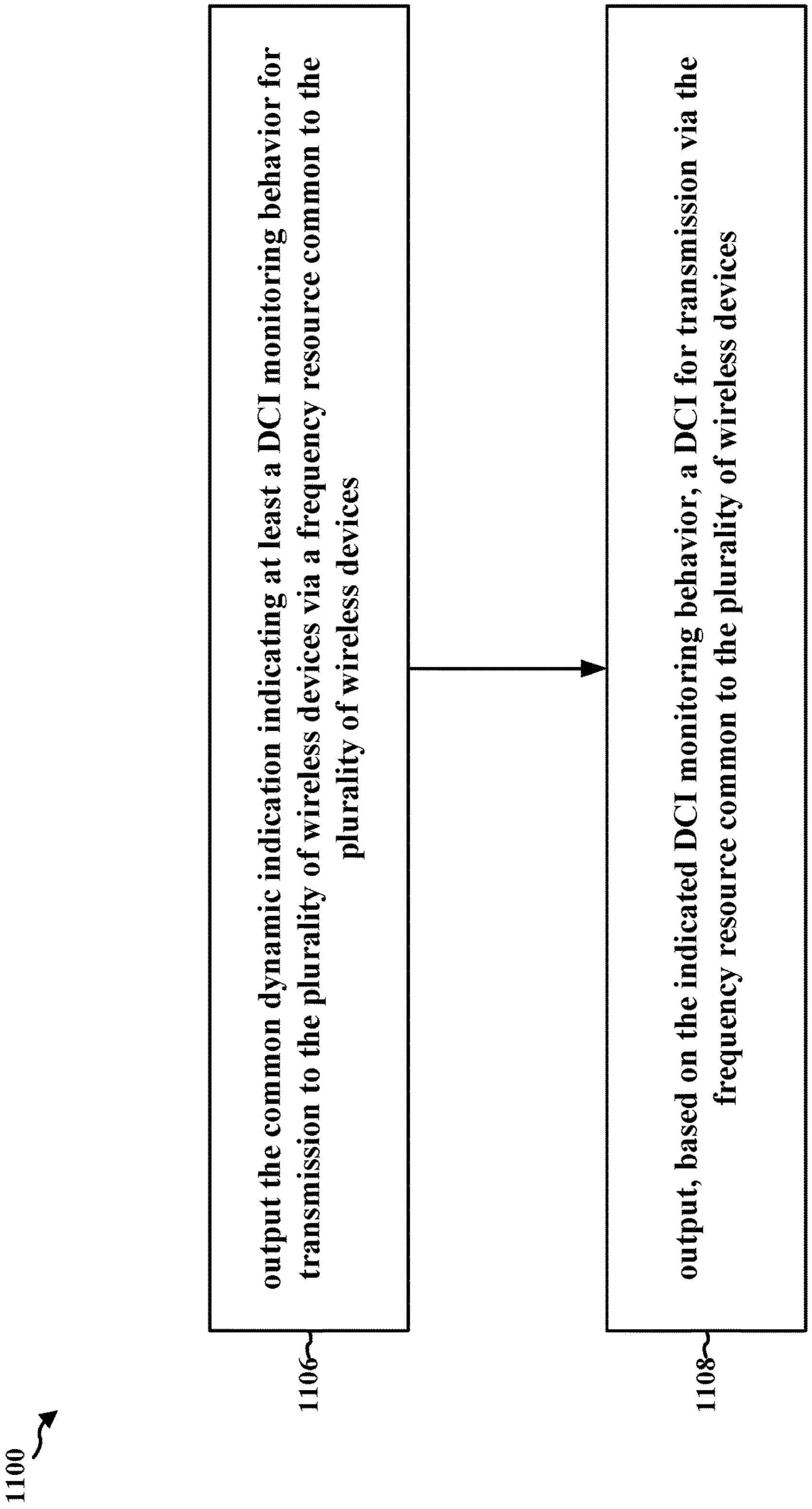
FIG. 11 is a flowchart of a method of wireless communication.

FIG. 11 is a flowchart 1100 of a method of wireless communication. The method may be performed by a network node such as a base station (e.g., the base station 102, 412, 414, 802; the network entity 1302, 1402). In some aspects, the base station may output a plurality of sets of UE-specific parameters associated with a plurality of UEs (wireless devices) configured to omit monitoring of indicated PDCCH resources. In some aspects, each set of UE-specific parameters of the plurality of sets of UE-specific parameters may include a set of SSSG identifiers and a duration associated with the plurality of wireless devices omitting monitoring of the indicated PDCCH resources. The plurality of sets of UE-specific parameters may be output (or transmitted) before outputting the common dynamic indication at 1106 and the set of UE-specific parameters may be used (e.g., referenced or indexed into) to indicate the at least one DCI monitoring behavior. For example, referring to FIGS. 6, 7A, 7B, and 8, the base station 802 may transmit, and the plurality of UEs 804 may receive, the one or more UE-specific DCI monitoring parameters 806 that may include the parameters associated with the first BWP switching operation 610 (e.g., an indication of BWP1, BWP2, the $T_{BWP}$ 615, the BWP inactivity time 617), the SSSG/NES switching operation 630 (e.g., an indication of the resources associated with SSSG0/NES1, SSSG1/NES2, the application delay 637, a default value for the indicated duration 639), and the PDCCH skipping operation 650 (e.g., an application delay similar to application delay 637, a default value for the indicated duration 653 such as the value T illustrated in FIG. 7A, or a set of selectable durations for the indicated duration 653 such as the value T1 or T2 illustrated in FIG. 7B).

The base station, in some aspects, may output an indication of the time delay for the plurality of wireless devices to apply the indicated DCI monitoring behavior. In some aspects, the indication of the time delay may be output for transmission in (or via) at least one of RRC signaling, a MAC-CE, or (additional) DCI. The time delay, in some aspects, may be indicated (e.g., defined or specified) as a number of symbols (or slots) after a last symbol of (or slot containing) DCI (or other signaling format or message) before applying (or implementing) the indicated DCI monitoring behavior. For a common dynamic indication (e.g., a common indication of DCI monitoring behavior) associated with a plurality of CCs including at least a first CC associated with a first numerology and a second CC associated with a second numerology that is higher than the first numerology, the time delay may be defined in terms of a number of symbols (or slots) associated with one of the first numerology or the second numerology. For example, referring to FIGS. 6, 7A, 7B, and 8, the base station 802 may transmit, and the plurality of UEs 804 may receive, the set of one or more time delay parameters 808 (e.g., the $T_{BWP}$ 615, the BWP inactivity time 617, the application delay 637, a default value for the indicated duration 639, an application delay similar to application delay 637 for omitting PDCCH monitoring, a default value for the indicated duration 653 such as the value T illustrated in FIG. 7A, or a set of selectable durations for the indicated duration 653 such as the value T1 or T2 illustrated in FIG. 7B).

At 1106, the base station may output (or transmit) a common dynamic indication indicating at least a DCI monitoring behavior for a plurality of UEs (or wireless devices) for transmission to the plurality of UEs via a frequency resource common to the plurality of UE. For example, 1106 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the common dynamic indication indicating at least the DCI monitoring behavior for the plurality of wireless devices for transmission to the plurality of UEs (wireless devices) may be included in one of a scheduling DCI or a non-scheduling DCI. The common dynamic indication, in some aspects, may be transmitted and/or received via one of at least one of RRC signaling, a MAC-CE, or an additional DCI. In some aspects, the common dynamic indication may be transmitted and/or received as a groupcast, multicast, or a broadcast transmission or message via the CFR. The DCI monitoring behavior indicated in the common dynamic indication, in some aspects, may be associated with one of an SSSG switching, a PDCCH (monitoring) skipping, or a mode of operation (e.g., a sleep mode) associated with an end of a burst of wireless (groupcast) traffic. In some aspects, the common dynamic indication may be associated with a BWP switching or a PCell switching.

As described above, the DCI monitoring behavior indicated in the common dynamic indication, in some aspects, may be associated with one or more of: unicast (PDCCH) resources for each UE in the plurality of the UEs (e.g., including at least the UE or the first wireless device), an indicated CFR, a set of CFRs, or each CFR associated with the plurality of UEs (the first wireless device or the plurality of wireless devices). The common dynamic indication output at 1106, in some aspects, may include an indication of an inactivity time, or an indication of an indicated duration, or may include an indication that the application of the behavior indicated in the common dynamic indication be implemented until a subsequent common dynamic indication is received. For example, referring to FIGS. 6, 7A, 7B, and 8, the base station 802 may transmit, and the plurality of UEs 804 may receive, the common indication of DCI monitoring behavior 810 indicating a DCI monitoring behavior for the UE (e.g., one or more of the first BWP switching operation 610, the SSSG/NES switching operation 630, or the PDCCH skipping operation 650). For example, the common indication of DCI monitoring behavior 810 may indicate one of the state transitions between the first state 710 and the second state 720 (or between the first state 750, the second state 760, and the third state 770) or a PDCCH monitoring skipping or monitoring before returning to a same state, and may further indicate a time duration associated with the indicated DCI monitoring behavior as discussed above.

At 1108, the base station may output, based on the indicated DCI monitoring behavior, a DCI for transmission via the frequency resource common to the plurality of wireless devices (e.g., a CFR). For example, 1108 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the DCI may be output at 1108 to be consistent with, monitored by, or based on the indicated DCI monitoring behavior for, or at, the plurality of UEs. The DCI monitoring behavior for, or at, the plurality of UEs may be associated with one of monitoring a second SSSG, omitting monitoring of the indicated PDCCH (e.g., based on the common dynamic indication received at 1106), or entering a sleep mode associated with an end of a burst of wireless (groupcast) traffic (e.g., for an XR application or other application associated with traffic that tends to be received in bursts of data separated by relatively long periods with no data exchanged and/or inactivity).

In some aspects, the DCI monitoring behavior for, or at, the plurality of UEs may be associated with a switch from a first PCell to a second indicated PCell, where the first PCell may be associated with a first DCI monitoring behavior implemented before outputting the DCI at 1108 and/or before outputting the common dynamic indication output at 1106 and the second PCell may be associated with outputting the DCI at 1108 in association with the common dynamic indication output at 1106. The DCI monitoring behavior for, or at, the plurality of UEs, in some aspects, may be associated with a switch to monitoring an indicated second BWP that is different from a first monitored BWP associated with a first DCI monitoring behavior implemented before outputting the DCI at 1108 and/or before outputting the common dynamic indication output at 1106. As described above, the DCI monitoring behavior for, or at, the plurality of UEs (associated with outputting the DCI at 1108 and/or the common dynamic indication output at 1106), in some aspects, may be associated with one or more of: unicast (PDCCH) resources for each UE in the plurality of the UEs, an indicated CFR, a set of CFRs, or each CFR associated with the plurality of UEs (the plurality of wireless devices). The monitoring behavior associated with outputting the DCI at 1108 and/or the common dynamic indication output at 1106 may be associated with one of an indicated time duration for implementation (or application) or may be associated with an inactivity timer or other triggering condition or event indicating an end time for the behavior indicated in the common dynamic indication output at 1106. For example, referring to FIGS. 6, 7A, 7B, and 8, the base station 802 may output/transmit DCI 814 to the plurality of UEs 804 in association with the plurality of UEs 804 monitoring, beginning at 812, for DCI based on the behavior indicated in the common indication of DCI monitoring behavior 810 (e.g., associated with one of the first BWP switching operation 610, the SSSG/NES switching operation 630, or the PDCCH skipping operation 650, or one of the state transitions between the first state 710 and the second state 720 illustrated in FIG. 7A or between the first state 750, the second state 760, and the third state 770 illustrated in FIG. 7B).

The base station may return to outputting control signaling (e.g., DCI or a MAC-CE) to the plurality of UEs (wireless devices) via a previously used (and monitored) set of (PDCCH) resources. For example, the base station may return to outputting control signaling to the plurality of UEs (wireless devices) via the first SSSG, the PDCCH occasions, the first BWP, or resources associated with the first PCell in association with the plurality of UEs returning to monitoring (or resuming monitoring) the first SSSG, the PDCCH occasions, the first BWP, or resources associated with the first PCell. The first SSSG and/or the first BWP, in some aspects, may be a default SSSG or a default BWP at the plurality of UEs. In some aspects, the UE may return to monitoring the previously monitored set of (PDCCH) resources (e.g., the first SSSG, the PDCCH occasions, the first BWP, the resources associated with the first PCell, or resources associated with an active (or awake) state) based on the indicated time duration for implementation (or application), an inactivity timer, or other triggering condition and/or event indicating an end time for the DCI monitoring behavior indicated in the common dynamic indication received at 1106 and begun at 1108. For example, referring to FIGS. 6, 7A, 7B, and 8, the base station 802 may output the DCI 820 during, or via, a monitored PDCCH occasion associated with the plurality of UEs 804 implementing, at 818, a default DCI monitoring behavior or an indicated (updated) DCI monitoring behavior that may represent a return to monitoring a previously monitored set of (PDCCH) resources (e.g., returning to a monitoring behavior implemented in slots 0 to 3 at a slot 8, slot 9, or slot 9 associated with one of the first BWP switching operation 610, the SSSG/NES switching operation 630, or the PDCCH skipping operation 650, respectively, which may be reflected in the state transitions of FIGS. 7A and 7B).

Figure 12:
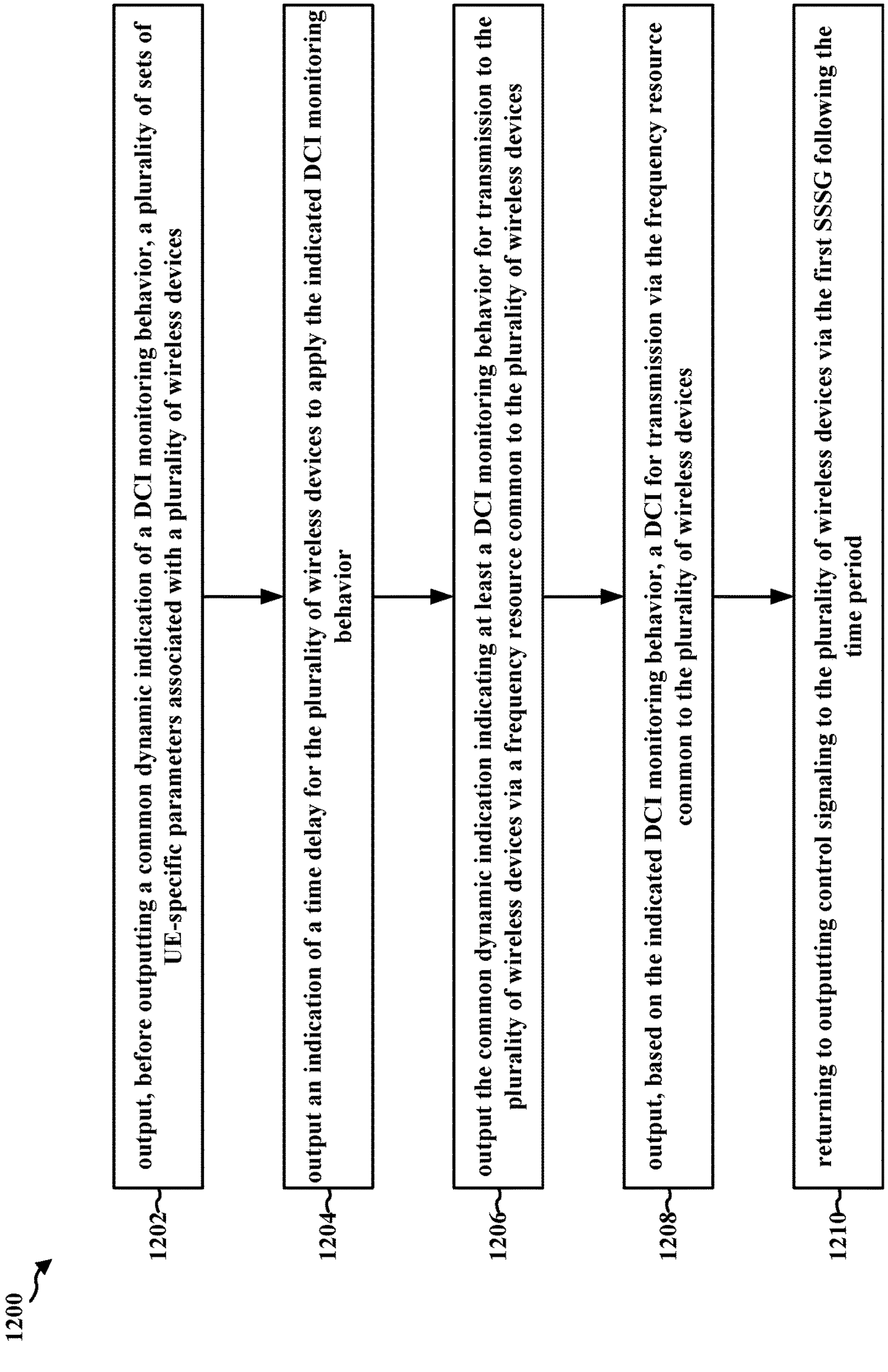
FIG. 12 is a flowchart of a method of wireless communication.

FIG. 12 is a flowchart 1200 of a method of wireless communication. The method may be performed by a network node such as a base station (e.g., the base station 102, 412, 414, 802; the network entity 1302, 1402). At 1202, the base station may output a plurality of sets of UE-specific parameters associated with a plurality of UEs (wireless devices) configured to omit monitoring of indicated PDCCH resources. In some aspects, each set of UE-specific parameters of the plurality of sets of UE-specific parameters may include a set of SSSG identifiers and a duration associated with the plurality of wireless devices omitting monitoring of the indicated PDCCH resources. For example, 1202 may be performed by CU processor(s) 1412, DU processor(s) 1432, RU processor(s) 1442, transceiver(s) 1446, antenna(s) 1480, and/or groupcast behavior modification component 199 of FIG. 14. The plurality of sets of UE-specific parameters may be output (or transmitted) before outputting the common dynamic indication at 1206 and the set of UE-specific parameters may be used (e.g., referenced or indexed into) to indicate the at least one DCI monitoring behavior. For example, referring to FIGS. 6, 7A, 7B, and 8, the base station 802 may transmit, and the plurality of UEs 804 may receive, the one or more UE-specific DCI monitoring parameters 806 that may include the parameters associated with the first BWP switching operation 610 (e.g., an indication of BWP1, BWP2, the $T_{BWP}$ 615, the BWP inactivity time 617), the SSSG/NES switching operation 630 (e.g., an indication of the resources associated with SSSG0/NES1, SSSG1/NES2, the application delay 637, a default value for the indicated duration 639), and the PDCCH skipping operation 650 (e.g., an application delay similar to application delay 637, a default value for the indicated duration 653 such as the value T illustrated in FIG. 7A, or a set of selectable durations for the indicated duration 653 such as the value T1 or T2 illustrated in FIG. 7B).

At 1204, the base station may output an indication of the time delay for the plurality of wireless devices to apply the indicated DCI monitoring behavior. For example, 1204 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the indication of the time delay may be output for transmission in (or via) at least one of RRC signaling, a MAC-CE, or (additional) DCI. The time delay, in some aspects, may be indicated (e.g., defined or specified) as a number of symbols (or slots) after a last symbol of (or slot containing) DCI (or other signaling format or message) before applying (or implementing) the indicated DCI monitoring behavior. For a common dynamic indication (e.g., a common indication of DCI monitoring behavior) associated with a plurality of CCs including at least a first CC associated with a first numerology and a second CC associated with a second numerology that is higher than the first numerology, the time delay may be defined in terms of a number of symbols (or slots) associated with one of the first numerology or the second numerology. For example, referring to FIGS. 6, 7A, 7B, and 8, the base station 802 may transmit, and the plurality of UEs 804 may receive, the set of one or more time delay parameters 808 (e.g., the $T_{BWP}$ 615, the BWP inactivity time 617, the application delay 637, a default value for the indicated duration 639, an application delay similar to application delay 637 for omitting PDCCH monitoring, a default value for the indicated duration 653 such as the value T illustrated in FIG. 7A, or a set of selectable durations for the indicated duration 653 such as the value T1 or T2 illustrated in FIG. 7B).

At 1206, the base station may output (or transmit) a common dynamic indication indicating at least a DCI monitoring behavior for a plurality of UEs (e.g., wireless devices) for transmission to the plurality of UEs via a frequency resource common to the plurality of UEs. For example, 1206 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the common dynamic indication indicating at least the DCI monitoring behavior for the plurality of UEs for transmission to the plurality of UEs may be included in one of a scheduling DCI or a non-scheduling DCI. The common dynamic indication, in some aspects, may be transmitted and/or received via one of at least one of RRC signaling, a MAC-CE, or an additional DCI. In some aspects, the common dynamic indication may be transmitted and/or received as a groupcast, multicast, or a broadcast transmission or message via the CFR. The DCI monitoring behavior indicated in the common dynamic indication, in some aspects, may be associated with one of an SSSG switching, a PDCCH (monitoring) skipping, or a mode of operation (e.g., a sleep mode) associated with an end of a burst of wireless (groupcast) traffic. In some aspects, the common dynamic indication may be associated with a BWP switching or a PCell switching. As described above, the DCI monitoring behavior indicated in the common dynamic indication, in some aspects, may be associated with one or more of: unicast (PDCCH) resources for each UE in the plurality of the UEs (e.g., including at least the UE or the first wireless device), an indicated CFR, a set of CFRs, or each CFR associated with the plurality of UEs (the first wireless device or the plurality of wireless devices). The common dynamic indication output at 1206, in some aspects, may include an indication of an inactivity time, or an indication of an indicated duration, or may include an indication that the application of the behavior indicated in the common dynamic indication be implemented until a subsequent common dynamic indication is received. For example, referring to FIGS. 6, 7A, 7B, and 8, the base station 802 may transmit, and the plurality of UEs 804 may receive, the common indication of DCI monitoring behavior 810 indicating a DCI monitoring behavior for the UE (e.g., one or more of the first BWP switching operation 610, the SSSG/NES switching operation 630, or the PDCCH skipping operation 650). For example, the common indication of DCI monitoring behavior 810 may indicate one of the state transitions between the first state 710 and the second state 720 (or between the first state 750, the second state 760, and the third state 770) or a PDCCH monitoring skipping or monitoring before returning to a same state, and may further indicate a time duration associated with the indicated DCI monitoring behavior as discussed above.

At 1208, the base station may output, based on the indicated DCI monitoring behavior, a DCI for transmission via the frequency resource common to the plurality of wireless devices (e.g., a CFR). For example, 1208 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the DCI may be output at 1208 to be consistent with, monitored by, or based on the indicated DCI monitoring behavior for, or at, the plurality of UEs. The DCI monitoring behavior for, or at, the plurality of UEs may be associated with one of monitoring a second SSSG, omitting monitoring of the indicated PDCCH (e.g., based on the common dynamic indication received at 1206), or entering a sleep mode associated with an end of a burst of wireless (groupcast) traffic (e.g., for an XR application or other application associated with traffic that tends to be received in bursts of data separated by relatively long periods with no data exchanged and/or inactivity). In some aspects, the DCI monitoring behavior for, or at, the plurality of UEs may be associated with a switch from a first PCell to a second indicated PCell, where the first PCell may be associated with a first DCI monitoring behavior implemented before outputting the DCI at 1208 and/or before outputting the common dynamic indication output at 1206 and the second PCell may be associated with outputting the DCI at 1208 in association with the common dynamic indication output at 1206. The DCI monitoring behavior for, or at, the plurality of UEs, in some aspects, may be associated with a switch to monitoring an indicated second BWP that is different from a first monitored BWP associated with a first DCI monitoring behavior implemented before outputting the DCI at 1208 and/or before outputting the common dynamic indication output at 1206. As described above, the DCI monitoring behavior for, or at, the plurality of UEs (associated with outputting the DCI at 1208 and/or the common dynamic indication output at 1206), in some aspects, may be associated with one or more of: unicast (PDCCH) resources for each UE in the plurality of the UEs, an indicated CFR, a set of CFRs, or each CFR associated with the plurality of UEs (the plurality of wireless devices). The monitoring behavior associated with outputting the DCI at 1208 and/or the common dynamic indication output at 1206 may be associated with one of an indicated time duration for implementation (or application) or may be associated with an inactivity timer or other triggering condition or event indicating an end time for the behavior indicated in the common dynamic indication output at 1206. For example, referring to FIGS. 6, 7A, 7B, and 8, the base station 802 may output/transmit DCI 814 to the plurality of UEs 804 in association with the plurality of UEs 804 monitoring, beginning at 812, for DCI based on the behavior indicated in the common indication of DCI monitoring behavior 810 (e.g., associated with one of the first BWP switching operation 610, the SSSG/NES switching operation 630, or the PDCCH skipping operation 650, or one of the state transitions between the first state 710 and the second state 720 illustrated in FIG. 7A or between the first state 750, the second state 760, and the third state 770 illustrated in FIG. 7B).

At 1210, the base station may return to outputting control signaling (e.g., DCI or a MAC-CE) to the plurality of UEs (wireless devices) via a previously used (and monitored) set of (PDCCH) resources. For example, at 1210, the base station may return to outputting control signaling to the plurality of UEs (wireless devices) via the first SSSG, the PDCCH occasions, the first BWP, or resources associated with the first PCell in association with the plurality of UEs returning to monitoring (or resuming monitoring) the first SSSG, the PDCCH occasions, the first BWP, or resources associated with the first PCell. The first SSSG and/or the first BWP, in some aspects, may be a default SSSG or a default BWP at the plurality of UEs. For example, 1210 may be performed by CU processor(s) 1412, DU processor(s) 1432, RU processor(s) 1442, transceiver(s) 1446, antenna(s) 1480, and/or groupcast behavior modification component 199 of FIG. 14. In some aspects, the UE may return to monitoring the previously monitored set of (PDCCH) resources (e.g., the first SSSG, the PDCCH occasions, the first BWP, the resources associated with the first PCell, or resources associated with an active (or awake) state) based on the indicated time duration for implementation (or application), an inactivity timer, or other triggering condition and/or event indicating an end time for the DCI monitoring behavior indicated in the common dynamic indication received at 1206 and begun at 1208. For example, referring to FIGS. 6, 7A, 7B, and 8, the base station 802 may output the DCI 820 during, or via, a monitored PDCCH occasion associated with the plurality of UEs 804 implementing, at 818, a default DCI monitoring behavior or an indicated (updated) DCI monitoring behavior that may represent a return to monitoring a previously monitored set of (PDCCH) resources (e.g., returning to a monitoring behavior implemented in slots 0 to 3 at a slot 8, slot 9, or slot 9 associated with one of the first BWP switching operation 610, the SSSG/NES switching operation 630, or the PDCCH skipping operation 650, respectively, which may be reflected in the state transitions of FIGS. 7A and 7B).

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize one or more antennas 1380 for communication. The cellular baseband processor(s) 1324 communicates through the transceiver(s) 1322 via the one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the groupcast behavior modification component 198 may be configured to receive, via a frequency resource common to a plurality of wireless devices including the first wireless device, a common dynamic indication indicating at least a DCI monitoring behavior for the plurality of wireless devices. The groupcast behavior modification component 198 may further be configured to monitor, based on the indicated DCI monitoring behavior, for a DCI via the frequency resource common to the plurality of wireless devices. The groupcast behavior modification component 198 may be within the cellular baseband processor(s) 1324, the application processor(s) 1306, or both the cellular baseband processor(s) 1324 and the application processor(s) 1306. The groupcast behavior modification component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving, via a frequency resource common to a plurality of wireless devices including the first wireless device, a common dynamic indication indicating at least a DCI monitoring behavior for the plurality of wireless devices. The apparatus 1304, and in particular the cellular baseband processor(s) 1324 and/or the application processor(s) 1306, may further include means for monitoring, based on the indicated DCI monitoring behavior, for a DCI via the frequency resource common to the plurality of wireless devices. The apparatus 1304, and in particular the cellular baseband processor(s) 1324 and/or the application processor(s) 1306, may further include means for returning to monitoring the first SSSG following the time period. The apparatus 1304, and in particular the cellular baseband processor(s) 1324 and/or the application processor(s) 1306, may further include means for receiving, before receiving the common dynamic indication, a set of UE-specific parameters for omitting monitoring of the indicated PDCCH resources. The apparatus 1304, and in particular the cellular baseband processor(s) 1324 and/or the application processor(s) 1306, may further include means for receiving an indication of the time delay for applying the indicated DCI monitoring behavior. The means may be the groupcast behavior modification component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 9 and 10.

Figure 14:
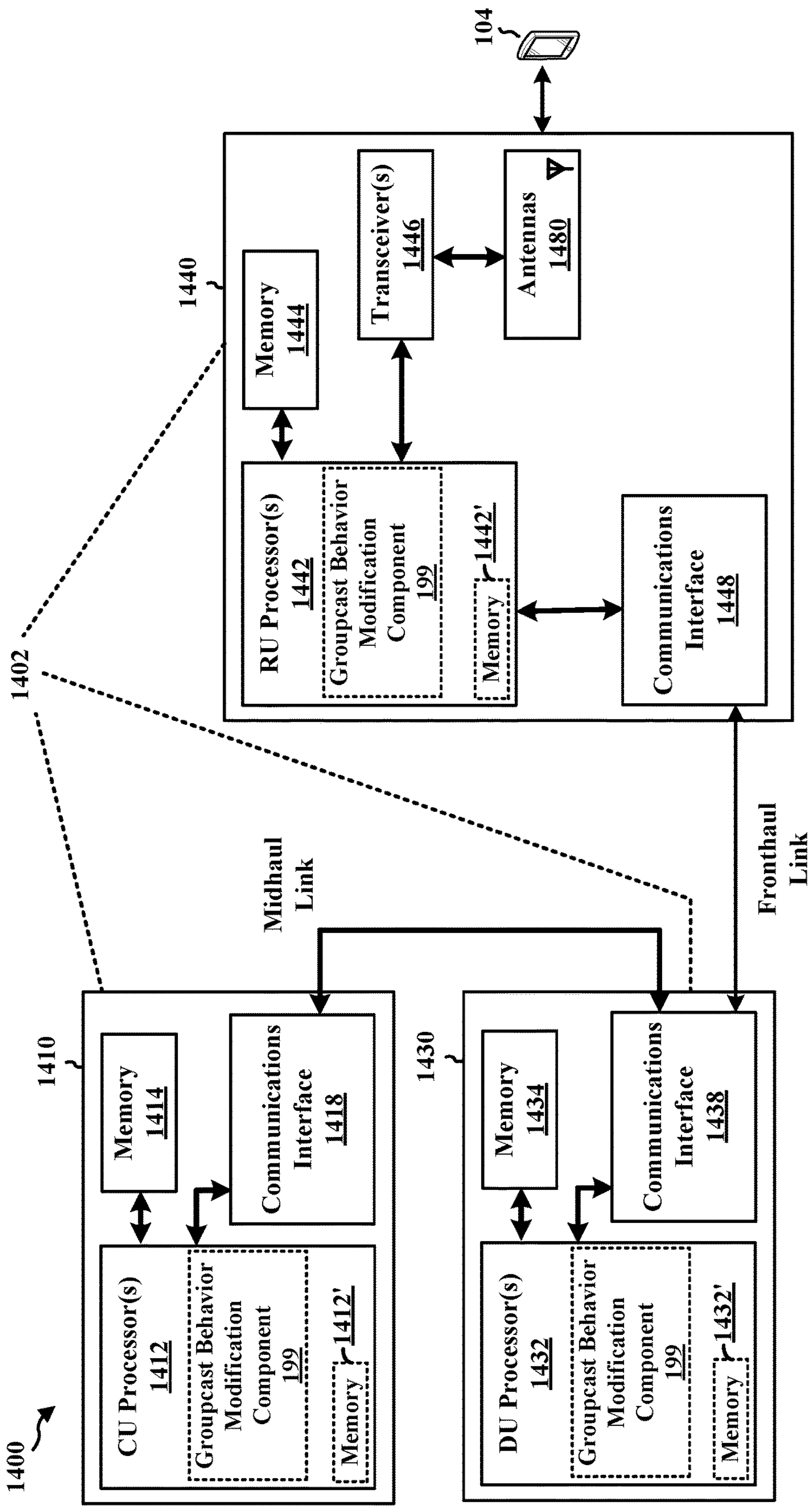
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the groupcast behavior modification component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, one or more antennas 1480, and a communications interface 1448. The RU 1440 communicates with the UE 104. The on-chip memory 1412', 1432'. 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the groupcast behavior modification component 199 may be configured to output a common dynamic indication indicating at least a DCI monitoring behavior for a plurality of wireless devices for transmission to the plurality of wireless devices via a frequency resource common to the plurality of wireless devices. The groupcast behavior modification component 199 may further be configured to output, based on the indicated DCI monitoring behavior, a DCI for transmission via the frequency resource common to the plurality of wireless devices. The groupcast behavior modification component 199 may be within one or more processors of one or more of the CU 1410, DU 1430, and the RU 1440. The groupcast behavior modification component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for outputting a common dynamic indication indicating at least a DCI monitoring behavior for a plurality of wireless devices for transmission to the plurality of wireless devices via a frequency resource common to the plurality of wireless devices. The network entity 1402 may further include means for outputting, based on the indicated DCI monitoring behavior, a DCI for transmission via the frequency resource common to the plurality of wireless devices. The network entity 1402 may further include means for returning to outputting control signaling to the plurality of wireless devices via the first SSSG following the time period. The network entity 1402 may further include means for outputting, before outputting the common dynamic indication, a plurality of sets of UE-specific parameters associated with the plurality of wireless devices omitting monitoring of the indicated PDCCH resources. The network entity 1402 may further include means for outputting an indication of the time delay for the plurality of wireless devices to apply the indicated DCI monitoring behavior. The means may be the groupcast behavior modification component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 11 and 12.

In some aspects of wireless communication, a wireless device (e.g., a UE) may be configured with parameters controlling the monitoring for unicast DCI. The wireless device may then receive a first unicast-DCI triggering a unicast-DCI monitoring behavior based on the configured parameters. In some aspects, the unicast-DCI monitoring behavior may be associated with one of omitting or skipping physical DL control channel (PDCCH) monitoring for an indicated amount of time (e.g., an indicated duration). The unicast-DCI monitoring behavior, in some aspects, may alternatively, or additionally, include switching a search space set group (SSSG) monitored by the wireless device. The unicast-DCI monitoring behavior, in some aspects, may be indicated via scheduling DCI (e.g., DCI that allocates/schedules resources for transmission or reception such as for one or more of a PDCCH, PDSCH, MCCH, or MTCH transmission or reception) or via non-scheduling DCI (e.g., DCI that carries control information but does not allocate/schedule resources for transmission or reception).

Various aspects relate generally to controlling DCI monitoring behavior for an MBS. Some aspects more specifically relate to transmitting and/or receiving, via a frequency resource common to a plurality of wireless devices (e.g., a plurality of wireless devices associated with a same multicast or broadcast group or transmission), a common dynamic indication indicating at least one DCI monitoring behavior for the plurality of wireless devices. The plurality of wireless devices may then begin monitoring, based on the indicated DCI monitoring behavior, for a DCI via the frequency resource common to the plurality of wireless devices and a base station may output, or transmit, DCI associated with the MBS based on the DCI monitoring behavior implemented at the plurality of wireless devices.

Particular aspects of the subject matter described in this disclosure can be implemented to realize one or more of the following potential advantages. In some examples, by transmitting a dynamic indication indicating at least one DCI monitoring behavior for the plurality of wireless devices, the described techniques can be used to reduce the overhead associated with the control information for an MBS.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, comprising: receiving, via a frequency resource common to a plurality of wireless devices including the first wireless device, a common dynamic indication indicating at least a downlink control information (DCI) monitoring behavior for the plurality of wireless devices; and monitoring, based on the indicated DCI monitoring behavior, for a DCI via the frequency resource common to the plurality of wireless devices.

Aspect 2 is the method of aspect 1, wherein the common dynamic indication is comprised in one of a scheduling DCI or a non-scheduling DCI.

Aspect 3 is the method of any of aspects 1 and 2, wherein the indicated DCI monitoring behavior is associated with one of a search space set group (SSSG) switching or physical downlink control channel (PDCCH) skipping, or an end of a burst of wireless traffic.

Aspect 4 is the method of aspect 3, wherein the indicated DCI monitoring behavior is associated with switching from monitoring a first SSSG to monitoring a second SSSG.

Aspect 5 is the method of aspect 4, wherein the switching from monitoring the first SSSG to monitoring the second SSSG is indicated for one or more of: unicast resources for the first wireless device, an indicated common frequency resource (CFR), a set of CFRs, or each CFR.

Aspect 6 is the method of any of aspects 4 and 5, wherein the common dynamic indication further indicates a time period to apply the switching from monitoring the first SSSG to monitoring the second SSSG, the method further comprising: returning to monitoring the first SSSG following the time period.

Aspect 7 is the method of any of aspects 4 to 6, wherein the first SSSG comprises a default SSSG.

Aspect 8 is the method of any of aspects 3 to 7, wherein the indicated DCI monitoring behavior is associated with omitting monitoring of indicated PDCCH resources.

Aspect 9 is the method of aspect 8, wherein the indicated PDCCH resources comprise one or more of: unicast PDCCH resources for the first wireless device, an indicated common frequency resource (CFR), a set of CFRs, or each CFR.

Aspect 10 is the method of aspect 9, further comprising: receiving, before receiving the common dynamic indication, a set of UE-specific parameters for omitting monitoring of the indicated PDCCH resources, wherein the set of UE-specific parameters comprises a set of SSSG identifiers and a duration associated with omitting monitoring of the indicated PDCCH resources.

Aspect 11 is the method of any of aspects 3 to 10, wherein the indicated DCI monitoring behavior is associated with entering into a sleep mode for an indicated amount of time.

Aspect 12 is the method of any of aspects 1 to 11, wherein the common dynamic indication is comprised in a MAC-CE.

Aspect 13 is the method of any of aspects 1 to 12, wherein different types of common dynamic indications for different DCI monitoring behavior are associated with one or more of: different radio network temporary identifiers (RNTIs), different control resource sets (CORESET) within the frequency resource that is common to the plurality of wireless devices, or different search spaces within the frequency resource that is common to the plurality of wireless devices.

Aspect 14 is the method of any of aspects 1 to 13, monitoring for the DCI comprises beginning monitoring for the DCI at a time following the common dynamic indication by an activation time.

Aspect 15 is the method of aspect 14, further comprising: receiving an indication of the time delay for applying the indicated DCI monitoring behavior.

Aspect 16 is the method of aspect 15, wherein the indication of the time delay is received in at least one of radio resource control (RRC) signaling, a medium access control-control element (MAC-CE), or an additional DCI.

Aspect 17 is the method of any of aspects 14 to 16, wherein the time delay is defined.

Aspect 18 is the method of aspect 17, wherein the common dynamic indication is associated with a plurality of component carriers (CCs) comprising at least a first CC associated with a first numerology and a second CC associated with a second numerology that is higher than the first numerology, wherein the time delay is defined in terms of a number of symbols associated with one of the first numerology or the second numerology.

Aspect 19 is the method of any of aspects 1 to 18, wherein the frequency resource common to the plurality of wireless devices is a common frequency resource (CFR) associated with at least one of groupcast communication, multicast communication, or broadcast communication and the common dynamic indication is received as a groupcast transmission, a multicast transmission, or a broadcast transmission via the CFR.

Aspect 20 is a method of wireless communication at a network node, comprising: outputting a common dynamic indication indicating at least a downlink control information (DCI) monitoring behavior for transmission to a plurality of wireless devices via a frequency resource common to the plurality of wireless devices; and outputting, based on the indicated DCI monitoring behavior, a DCI for transmission via the frequency resource common to the plurality of wireless devices.

Aspect 21 is the method of Aspect 20, wherein the common dynamic indication is comprised in one of a scheduling DCI or a non-scheduling DCI.

Aspect 22 is the method of any of aspects 20 and 21, wherein the indicated DCI monitoring behavior is associated with one of a search space set group (SSSG) switching or physical downlink control channel (PDCCH) skipping, or an end of a burst of wireless traffic.

Aspect 23 is the method of aspect 22, wherein the indicated DCI monitoring behavior indicates for the plurality of wireless devices to switch from monitoring a first SSSG to monitoring a second SSSG.

Aspect 24 is the method of aspect 23, wherein the switch from monitoring the first SSSG to monitoring the second SSSG is indicated for one or more of: unicast resources for the plurality of wireless devices, an indicated common frequency resource (CFR), a set of CFRs, or each CFR.

Aspect 25 is the method of any of aspects 23 and 24, wherein the common dynamic indication further indicates a time period to apply the switch from monitoring the first SSSG to monitoring the second SSSG, the method further comprising: returning to outputting control signaling to the plurality of wireless devices via the first SSSG following the time period.

Aspect 26 is the method of any of aspects 23 to 25, wherein the first SSSG comprises a default SSSG.

Aspect 27 is the method of any of aspects 22 to 26, wherein the indicated DCI monitoring behavior indicates for the plurality of wireless devices to omit monitoring of indicated PDCCH resources.

Aspect 28 is the method of aspect 27, wherein the indicated PDCCH resources comprise one or more of: unicast PDCCH resources for the plurality of wireless devices, an indicated common frequency resource (CFR), a set of CFRs, or each CFR.

Aspect 29 is the method of aspect 28, further comprising: outputting, before outputting the common dynamic indication, a plurality of sets of UE-specific parameters associated with the plurality of wireless devices omitting monitoring of the indicated PDCCH resources, wherein each set of UE-specific parameters of the plurality of sets of UE-specific parameters comprises a set of SSSG identifiers and a duration associated with the plurality of wireless devices omitting monitoring of the indicated PDCCH resources.

Aspect 30 is the method of any of aspects 22 to 29, wherein the indicated DCI monitoring behavior is associated with the plurality of wireless devices entering into a sleep mode for an indicated amount of time.

Aspect 31 is the method of any of aspects 20 to 30, wherein the common dynamic indication is comprised in a MAC-CE.

Aspect 32 is the method of any of aspects 20 to 31, wherein different types of common dynamic indications for different DCI monitoring behavior are associated with one or more of: different radio network temporary identifiers (RNTIs), different control resource sets (CORESET) within the frequency resource that is common to the plurality of wireless devices, or different search spaces within the frequency resource that is common to the plurality of wireless devices.

Aspect 33 is the method of any of aspects 20 to 32, wherein outputting the DCI comprises outputting the DCI for transmission at a time following the common dynamic indication by at least an activation time.

Aspect 34 is the method of aspect 33, further comprising: outputting an indication of the time delay for the plurality of wireless devices to apply the indicated DCI monitoring behavior.

Aspect 35 is the method of aspect 34, wherein the indication of the time delay is output for transmission in at least one of radio resource control (RRC) signaling, a medium access control-control element (MAC-CE), or an additional DCI.

Aspect 36 is the method of any of aspects 33 to 35, wherein the time delay is defined.

Aspect 37 is the method of aspect 36, wherein the common dynamic indication is associated with a plurality of component carriers (CCs) comprising at least a first CC associated with a first numerology and a second CC associated with a second numerology that is higher than the first numerology, wherein the time delay is defined in terms of a number of symbols associated with one of the first numerology or the second numerology.

Aspect 38 is the method of any of aspects 20 to 37, wherein the frequency resource common to the plurality of wireless devices is a common frequency resource (CFR) associated with at least one of groupcast communication, multicast communication, or broadcast communication and the common dynamic indication is received as a groupcast transmission, a multicast transmission, or a broadcast transmission via the CFR.

Aspect 39 is an apparatus for wireless communication at a device including a memory and at least one processor coupled to the memory and, based at least in part on information stored in the memory, the at least one processor is configured to implement any of aspects 1 to 38.

Aspect 40 is the apparatus of aspect 39, further including a transceiver or an antenna coupled to the at least one processor.

Aspect 41 is an apparatus for wireless communication at a device including means for implementing any of aspects 1 to 38.

Aspect 42 is a computer-readable medium (e.g., a non-transitory computer-readable medium) storing computer executable code, where the code when executed by a processor causes the processor to implement any of aspects 1 to 38.

What is claimed is:

1. An apparatus for wireless communication at a first wireless device comprising:

at least one memory; and at least one processor coupled to the at least one memory and, based at least in part on information stored in the at least one memory, the at least one processor is configured to:

receive a set of user-equipment-specific (UE-specific) parameters for omitting monitoring of indicated physical downlink control channel (PDCCH) resources, wherein the set of UE-specific parameters comprises a set of search space set group (SSSG) identifiers and a duration associated with omitting the monitoring of the indicated PDCCH resources;

receive, via a frequency resource common to a plurality of wireless devices including the first wireless device, a common dynamic indication indicating at least a downlink control information (DCI) monitoring behavior for the plurality of wireless devices, wherein the indicated DCI monitoring behavior is associated with omitting the monitoring of indicated PDCCH resources; and monitor, based on the indicated DCI monitoring behavior, for a DCI via the frequency resource common to the plurality of wireless devices.

2. The apparatus of claim 1, wherein, to receive the common dynamic indication, the at least one processor is configured to receive the common dynamic indication in one of a scheduling DCI or a non-scheduling DCI.

3. The apparatus of claim 1, wherein the indicated DCI monitoring behavior is further associated with a switch from monitoring a first search space set group (SSSG) to monitoring a second SSSG.

4. The apparatus of claim 3, wherein the switch from monitoring the first SSSG to monitoring the second SSSG is indicated for one or more of:

unicast resources for the first wireless device, an indicated common frequency resource (CFR), a set of CFRs, or each CFR.

5. The apparatus of claim 3, wherein the first SSSG comprises a default SSSG and wherein the common dynamic indication further indicates a time period to apply the switch from monitoring the first SSSG to monitoring the second SSSG, the at least one processor is further configured to:

return to monitor the first SSSG following the time period.

6. The apparatus of claim 1, wherein the indicated PDCCH resources comprise one or more of:
unicast PDCCH resources for the first wireless device,
an indicated common frequency resource (CFR),
a set of CFRs, or
each CFR.

7. The apparatus of claim 1, wherein different types of common dynamic indications for different DCI monitoring behavior are associated with one or more of:
different radio network temporary identifiers (RNTIs),
different control resource sets (CORESET) within the frequency resource that is common to the plurality of wireless devices, or
different search spaces within the frequency resource that is common to the plurality of wireless devices.

8. The apparatus of claim 1, wherein the at least one processor is further configured to:
receive an indication of a time delay for applying the indicated DCI monitoring behavior, wherein, to monitor for the DCI, the at least one processor is further configured to begin monitoring for the DCI based on the time delay.

9. The apparatus of claim 8, wherein the common dynamic indication is associated with a plurality of component carriers (CCs) comprising at least a first CC associated with a first numerology and a second CC associated with a second numerology that is higher than the first numerology, wherein the time delay is defined in terms of a number of symbols associated with one of the first numerology or the second numerology.

10. The apparatus of claim 1, wherein the frequency resource common to the plurality of wireless devices is a common frequency resource (CFR) associated with at least one of groupcast communication, multicast communication, or broadcast communication and to receive the common dynamic indication the at least one processor is further configured to receive the common dynamic indication as a groupcast transmission, a multicast transmission, or a broadcast transmission via the CFR.

11. An apparatus for wireless communication at a network node, comprising:
at least one memory; and
at least one processor coupled to the at least one memory and, based at least in part on information stored in the at least one memory, the at least one processor is configured to:
transmit a set of user-equipment-specific (UE-specific) parameters for omitting monitoring of indicated physical downlink control channel (PDCCH) resources, wherein the set of UE-specific parameters comprises a set of search space set group (SSSG) identifiers and a duration associated with omitting the monitoring of the indicated PDCCH resources;
transmit a common dynamic indication indicating at least a downlink control information (DCI) monitoring behavior for a plurality of wireless devices for transmission to the plurality of wireless devices via a frequency resource common to the plurality of wireless devices, wherein the indicated DCI monitoring behavior indicates for the plurality of wireless devices to omit monitoring of the indicated PDCCH resources; and
transmit, based on the indicated DCI monitoring behavior, a DCI for transmission via the frequency resource common to the plurality of wireless devices.

12. The apparatus of claim 11, wherein, to transmit the DCI, the at least one processor is further configured to transmit the DCI for transmission in one of a scheduling DCI or a non-scheduling DCI.

13. The apparatus of claim 11, wherein the indicated DCI monitoring behavior indicates for the plurality of wireless devices to switch from monitoring a first search space set group (SSSG) to monitoring a second SSSG.

14. The apparatus of claim 13, wherein the switch from monitoring the first SSSG to monitoring the second SSSG is indicated for one or more of:
unicast resources for the plurality of wireless devices,
an indicated common frequency resource (CFR),
a set of CFRs, or
each CFR.

15. The apparatus of claim 13, wherein the first SSSG comprises a default SSSG and wherein the common dynamic indication further indicates a time period to apply the switch from monitoring the first SSSG to monitoring the second SSSG, and wherein the at least one processor is further configured to:
return to transmitting control signaling to the plurality of wireless devices via the first SSSG following the time period.

16. The apparatus of claim 11, wherein the indicated PDCCH resources comprise one or more of:
unicast PDCCH resources for the plurality of wireless devices,
an indicated common frequency resource (CFR),
a set of CFRs, or
each CFR.

17. The apparatus of claim 11, wherein different types of common dynamic indications for different DCI monitoring behavior are associated with one or more of:
different radio network temporary identifiers (RNTIs),
different control resource sets (CORESET) within the frequency resource that is common to the plurality of wireless devices, or
different search spaces within the frequency resource that is common to the plurality of wireless devices.

18. The apparatus of claim 11, the at least one processor is further configured to:
transmit an indication of a time delay for the plurality of wireless devices to apply the indicated DCI monitoring behavior, and wherein to transmit the DCI, the at least one processor is further configured to transmit the DCI for transmission based on the time delay.

19. The apparatus of claim 18, wherein the common dynamic indication is associated with a plurality of component carriers (CCs) comprising at least a first CC associated with a first numerology and a second CC associated with a second numerology that is higher than the first numerology, wherein the time delay is defined in terms of a number of symbols associated with one of the first numerology or the second numerology.

20. The apparatus of claim 11, wherein the frequency resource common to the plurality of wireless devices is a common frequency resource (CFR) associated with at least one of groupcast communication, multicast communication, or broadcast communication, and wherein, to transmit the DCI, the at least one processor is further configured to transmit the DCI for transmission as a groupcast transmission, a multicast transmission, or a broadcast transmission via the CFR.

21. A method of wireless communication at a first wireless device, comprising:

receiving a set of user-equipment-specific (UE-specific) parameters for omitting monitoring of indicated physical downlink control channel (PDCCH) resources, wherein the set of UE-specific parameters comprises a set of search space set group (SSSG) identifiers and a duration associated with omitting the monitoring of the indicated PDCCH resources;

receiving, via a frequency resource common to a plurality of wireless devices including the first wireless device, a common dynamic indication indicating at least a downlink control information (DCI) monitoring behavior for the plurality of wireless devices, wherein the indicated DCI monitoring behavior is associated with omitting the monitoring of indicated PDCCH resources; and monitoring, based on the indicated DCI monitoring behavior, for a DCI via the frequency resource common to the plurality of wireless devices.

22. The method of claim 21, wherein the frequency resource common to the plurality of wireless devices is a common frequency resource (CFR) associated with at least one of groupcast communication, multicast communication, or broadcast communication and the common dynamic indication is received as a groupcast transmission, a multicast transmission, or a broadcast transmission via the CFR.

23. The method of claim 21, wherein the indicated DCI monitoring behavior is further associated with at least one of switching from monitoring a first search space set group (SSSG) to monitoring a second SSSG or omitting monitoring of indicated PDCCH resources.

24. A method of wireless communication at a network node, comprising:

transmitting a set of user-equipment-specific (UE-specific) parameters for omitting monitoring of indicated physical downlink control channel (PDCCH) resources, wherein the set of UE-specific parameters comprises a set of search space set group (SSSG) identifiers and a duration associated with omitting the monitoring of the indicated PDCCH resources;

transmitting a common dynamic indication indicating at least a downlink control information (DCI) monitoring behavior for a plurality of wireless devices for transmission to the plurality of wireless devices via a frequency resource common to the plurality of wireless devices, wherein the indicated DCI monitoring behavior indicates for the plurality of wireless devices to omit monitoring of the indicated PDCCH resources; and transmitting, based on the indicated DCI monitoring behavior, a DCI for transmission via the frequency resource common to the plurality of wireless devices.

25. The method of claim 24, wherein the frequency resource common to the plurality of wireless devices is a common frequency resource (CFR) associated with at least one of groupcast communication, multicast communication, or broadcast communication and the common dynamic indication is transmitted as a groupcast transmission, a multicast transmission, or a broadcast transmission via the CFR.

26. The method of claim 24, wherein the indicated DCI monitoring behavior indicates for the plurality of wireless devices to at least one of switch from monitoring a first search space set group (SSSG) to monitoring a second SSSG or omit monitoring of indicated PDCCH resources.

* * * * *